(12) United States Patent
Solomon

(10) Patent No.: US 8,303,233 B2
(45) Date of Patent: Nov. 6, 2012

(54) STORAGE AND RETRIEVAL SYSTEM

(75) Inventor: Stanley B. Solomon, Rolling Hills Estates, CA (US)

(73) Assignee: Worthwhile Products, Rolling Hills Estates, CA (US)

( * ) Notice: Subject to any disclaimer, the term of this patent is extended or adjusted under 35 U.S.C. 154(b) by 0 days.

(21) Appl. No.: 12/967,513

(22) Filed: Dec. 14, 2010

(65) Prior Publication Data

US 2011/0101837 A1 May 5, 2011

Related U.S. Application Data

(63) Continuation-in-part of application No. 11/854,246, filed on Sep. 12, 2007, now Pat. No. 7,850,411, which is a continuation-in-part of application No. 11/308,791, filed on May 4, 2006, now Pat. No. 7,689,480, which is a continuation-in-part of application No. 11/195,248, filed on Aug. 1, 2005, now Pat. No. 7,168,905.

(51) Int. Cl.
*B65G 1/00* (2006.01)

(52) U.S. Cl. ........ 414/277; 414/237; 198/580; 312/131; 312/132; 104/130.07

(58) Field of Classification Search .......... 414/237, 414/277, 282, 331.03, 331.04, 331.06; 198/580; 312/131, 132, 266, 267; 104/130.07
See application file for complete search history.

(56) References Cited

U.S. PATENT DOCUMENTS

| | | |
|---|---|---|
| 2,089,341 A | 8/1937 | Cocks |
| 2,451,120 A | 10/1948 | Rossetter |
| 2,617,700 A | 11/1952 | Christie et al. |
| 2,881,041 A | 4/1959 | Liebman |
| 3,432,044 A | 3/1969 | Heinz |
| 3,639,023 A * | 2/1972 | Anders et al. ............... 312/268 |
| 3,717,102 A | 2/1973 | Lott et al. |
| 3,763,991 A | 10/1973 | Batik |
| 3,860,130 A | 1/1975 | Frangos |
| 3,883,203 A | 5/1975 | Lexe |
| 4,191,435 A | 3/1980 | Lehman |
| 4,422,554 A | 12/1983 | Lichti |
| 4,615,430 A | 10/1986 | Satoh |
| 4,975,012 A * | 12/1990 | Motoda ..................... 414/279 |
| 5,921,739 A | 7/1999 | Keip |
| 6,188,936 B1 * | 2/2001 | Maguire et al. ............. 700/265 |
| 6,397,126 B1 * | 5/2002 | Nelson ....................... 700/236 |
| 6,792,935 B2 | 9/2004 | Williams et al. |
| 6,851,611 B1 | 2/2005 | Shaw-Sinclair |
| 6,870,464 B2 | 3/2005 | Okamura |
| 6,923,612 B2 | 8/2005 | Hansl |
| 6,927,692 B1 | 8/2005 | Petrinovic |
| 6,996,538 B2 | 2/2006 | Lucas |
| 7,585,143 B2 * | 9/2009 | Hanaoka ................ 414/331.02 |
| 2003/0031539 A1 * | 2/2003 | Nulman et al. ........... 414/217.1 |
| 2003/0077153 A1 | 4/2003 | Elliott et al. |
| 2003/0118428 A1 | 6/2003 | McFarland |
| 2004/0081538 A1 * | 4/2004 | Rice et al. .............. 414/222.01 |

* cited by examiner

*Primary Examiner* — Scott Lowe
(74) *Attorney, Agent, or Firm* — Lowry Blixseth LLP; Scott M. Lowry

(57) ABSTRACT

The storage and retrieval system includes a frame having at least two columns adjacent to one another. A track is disposed in each column, each track being generally parallel to one another. A plurality of storage units reside and move within the tracks. An actuator coupled to the frame displaces the storage units in the columns and a pair of conveyors move the storage units between columns to permit sequential clockwise or counterclockwise movement of the plurality of storage units within the frame.

21 Claims, 21 Drawing Sheets

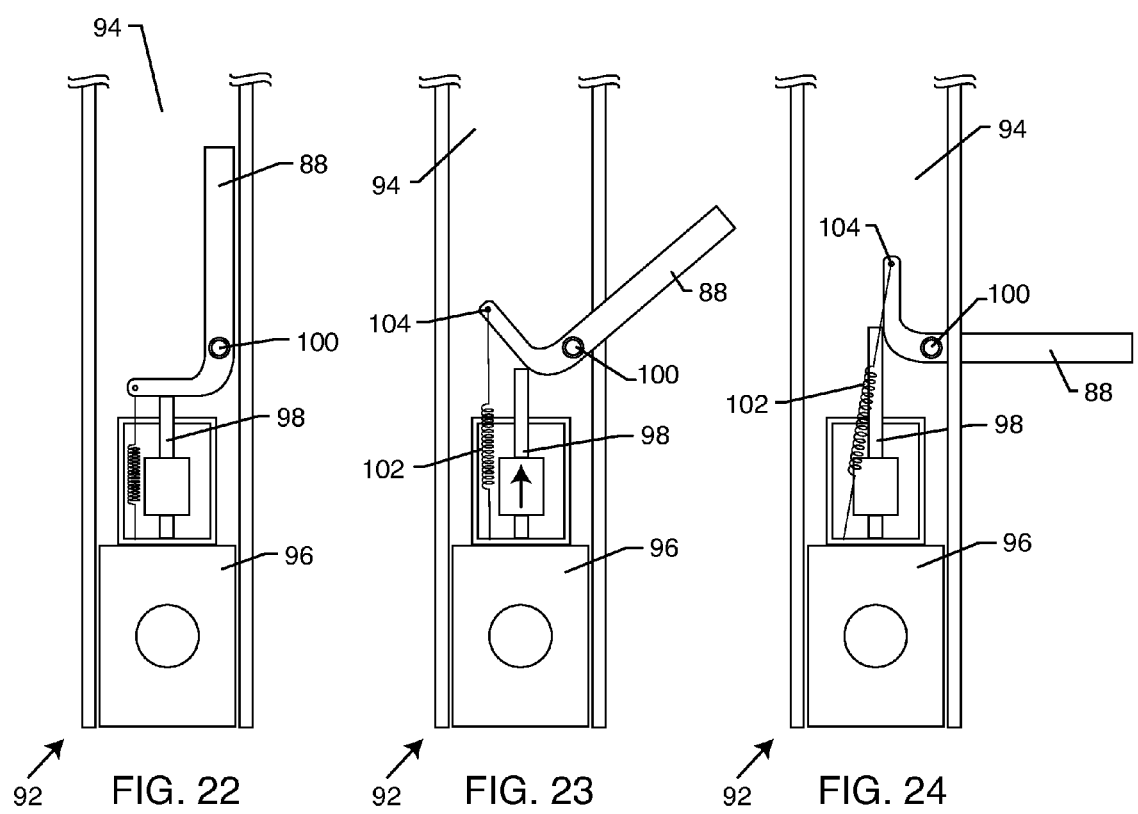

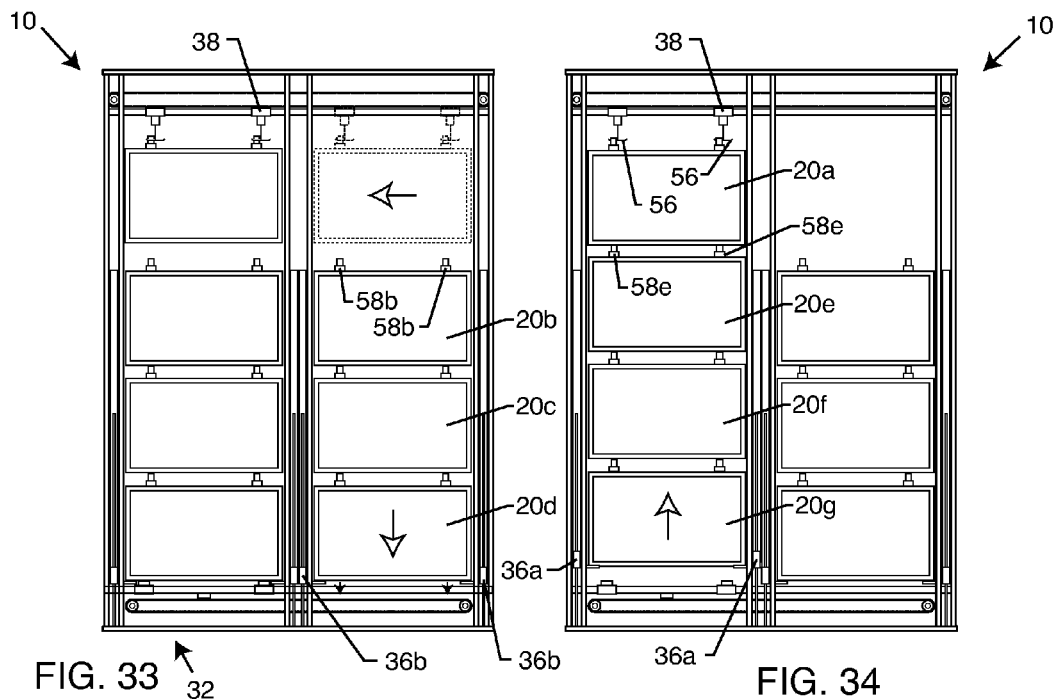
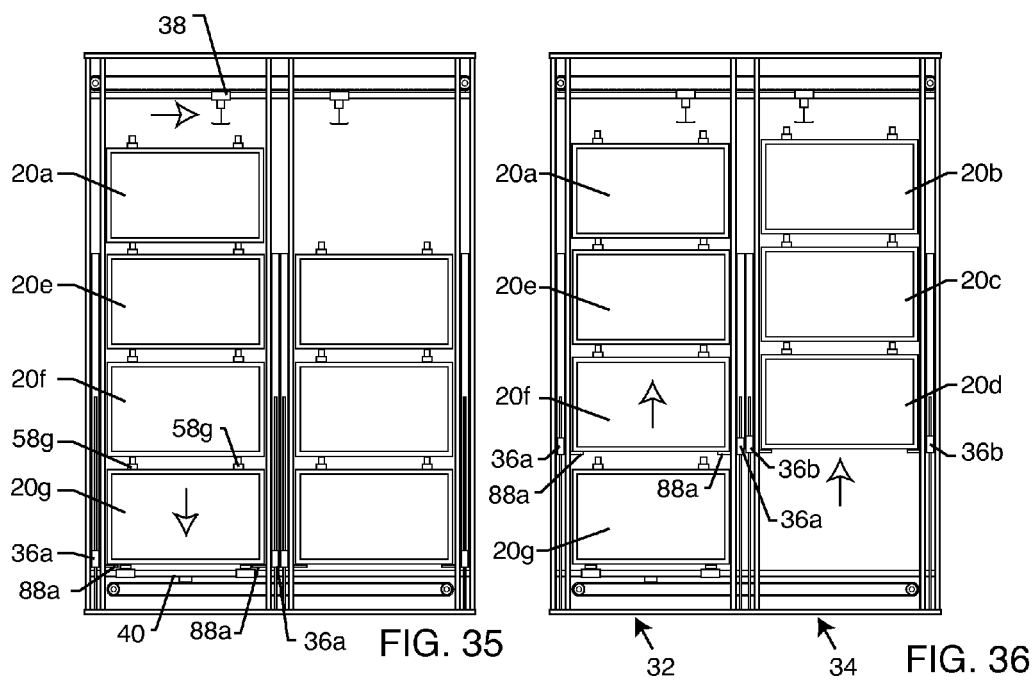

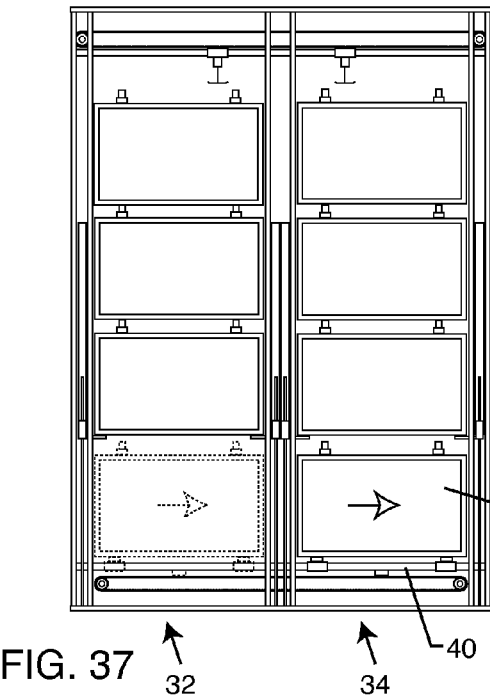
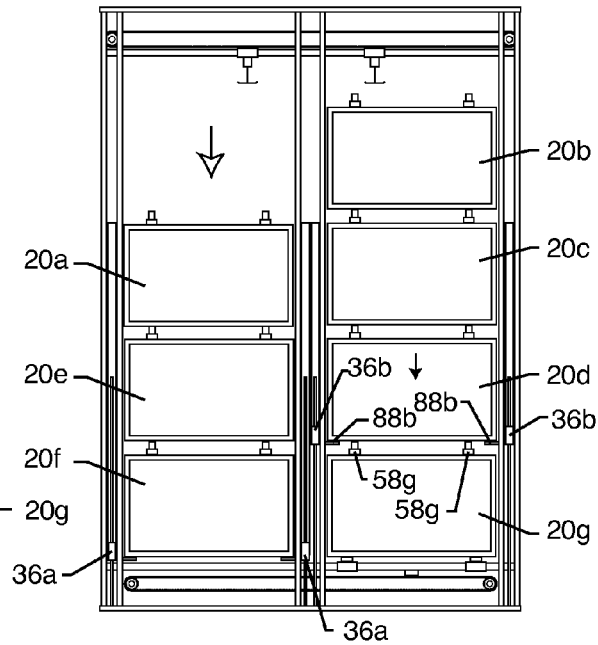
FIG. 37
FIG. 38
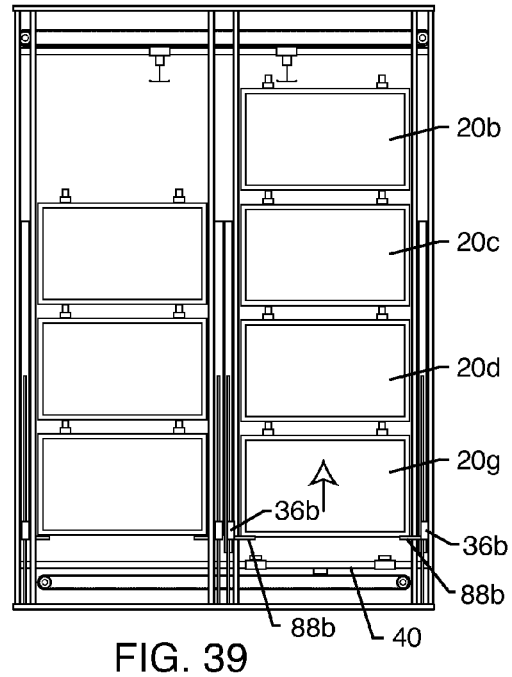
FIG. 39

STORAGE AND RETRIEVAL SYSTEM

BACKGROUND OF THE INVENTION

The present invention generally relates to storage and retrieval systems. More particularly, the present invention is directed towards a modular storage and retrieval system employing a plurality of movable storage units.

In the kitchen, pots, pans, flour, condiments, boxes and cans of food, mixers and other paraphernalia are usually stored in drawers and cupboards which are scattered throughout the kitchen. Pots and pans are ordinarily kept in cupboards which are dark, difficult to access and maintain. The average person is subjected to considerable exercise and rummaging through cupboards in an attempt to locate a pot or pan of the desired shape and size. Many cupboards are either below sinks or stoves, or elevated. This requires the person to bend down to find the desired container, pot or food article, or sometimes stand on a chair to retrieve these items. The storage of such kitchen equipment and food takes up a large number of cubic feet of space, some of which is wasted as the items are not readily retrievable in corners.

A similar problem is encountered with closets, which are used to store shoes, pants, blouses, dresses, socks and other non-clothing items. Oftentimes, shoes are stored on the floor, clothes are hung on elongated rods in the closet (which often do not provide sufficient storage space) and other items are stacked on shelves—often at a considerable height. Such an arrangement presents many of the same disadvantages of kitchen storage.

Retrieving items in such settings is particularly difficult for those individuals who are taller than usual, shorter than usual, elderly or handicapped. Much of the space in corners and near ceilings is wasted space in a household.

The present invention seeks to provide a simplified, efficient and comparatively inexpensive storage conveyor apparatus for easy installation in a kitchen, closet, or the like. The invention can utilize adjacent wasted spaces above stairways, beneath floors, above ceilings, in corners, etc.

Various conveyor systems for a wide variety of goods, including elevating conveyors, horizontal conveyors, and combination types, are known in the prior art. This so-called "dumb-waiter" for elevating various articles in homes, restaurants and the like between different floor levels has long been known. The art relating to storage and display cases provides a number of devices in which two adjacent columns of containers are disposed one behind the other with the upward movement of one column and a downward movement of the adjacent one being obtained by associating the various containers with chains or cables passing over suitable wheels or sprockets. However, such devices present various drawbacks. For example, the type of movement from one column to another characteristic of the chain or cable type mechanism is such that a considerable amount of clearance is required for the containers. Moreover, the sprockets and cables operate under considerable loads and the bearings necessary to support these loads must be mounted upon sufficient structures to adequately carry the stresses to the floor. An elaborate shifting sequence must take place as the tension members pass over the pulleys in order to avoid inverting the containers during the process.

One of the main drawbacks encountered in automatic and semi-automatic storage systems relates to the complexity of the mechanisms used. Such complexity adds to the cost of installing the system, and adversely affects the reliability of such systems. Incorporating chain and pulley systems, unique lifting mechanisms, etc., renders the systems complicated and expensive to build, prone to breakage, and increases maintenance time and costs.

Another drawback encountered with storage systems relates to an owner of an object not being able to remember or locate where that object was stored in their home. The owner of the object may know that the object is stored somewhere in their house but may not be able to remember in which room or in what storage device the object is located. An inventory control system that can identify and keep track of objects is therefore highly desirable. While some objects, such as products purchased from commercial entities (e.g., retail stores, wholesalers or the like) have identifying indicia, such as Uniform Product Code (UPC) numbers, many objects do not. For example, UPC numbers are used on can labels and tags attached to clothing. However, many objects either do not have such labels or tags in the first place or they were removed from the object after purchase.

Accordingly, there is a continuing need for an automated storage and retrieval system which is simplified, efficient and comparatively inexpensive. Moreover, there is a continuing need for an automated storage and retrieval system that can quickly present a selected storage unit out through a common opening at a position convenient for virtually any user. Such an inventory control system preferably operates in a wheelless system to minimize the quantity of moving parts in order to simplify repair and maintenance. The present invention fulfills these needs and provides other related advantages.

SUMMARY OF THE INVENTION

The storage and retrieval system generally includes a frame having at least two columns adjacent to one another. A track is disposed within each column, each track being generally parallel to one another. An actuator is coupled to the frame for displacing one or more of the storage units in one or more of the columns. A first conveyor is able to move at least one of the storage units between a first position in one column to a first position in another column. Likewise, the storage and retrieval system includes a second conveyor for moving at least one storage unit between a second position in one column to a second position in another column. In a preferred embodiment, the first and second conveyors are coupled to the upper and lower portions of the frame. Thus, sequential activation of the actuator, the first conveyor, and the second conveyor permits sequential clockwise or counterclockwise movement of the plurality of storage units within the frame.

Preferably, the tracks are generally vertically disposed within the columns to allow the storage units to slidably reside therein. A low-friction material may be disposed along an interior surface of each of the tracks to further facilitate sliding movement of the storage units therein and within the interior of the frame. The actuators are able to vertically displace one or more storage units in the vertical tracks by deploying an arm for engagement underneath one storage unit. The arm is activated by a spring-tensioned solenoid deployment mechanism operated by a control circuit. In a preferred embodiment, a first actuator and an associated spring-tensioned solenoid deployment mechanism is positioned to selectively engage and displace one or more storage units in one column and a second actuator and associated spring-tensioned solenoid deployment mechanism is positioned to selectively engage and displace one or more storage units in another column. The first and second actuators should be able to move independently of one another.

The first conveyor preferably includes an upper conveyor that moves at least one storage unit between an uppermost position in one column to an uppermost position in another column. For example, the upper conveyor may have a hook assembly that is selectively movable from a first position adjacent to one column of storage units to a second position adjacent to another column of storage units. The hook assembly moves between columns along an upper support rail and is designed to selectively engage a catch coupled to the storage unit. Engagement of the hook assembly with the catch permits the upper conveyor to support and move the storage unit from the uppermost position in one column to the uppermost position in another column. Additionally, the second conveyor preferably includes a lower conveyor that selectively moves at least one storage unit between a lowermost position in one column to a lowermost position in another column. The lower conveyor is preferably coupled to a lower support rail fixed to the frame. In one embodiment, the lower conveyor is a carriage assembly adapted to releasably retain a storage unit during movement between columns. In this regard, the storage and retrieval system can reposition wheelless storage units within the frame, as desired.

The frame is preferably covered by a housing that insulates the storage units therein. The housing includes a window for providing access to one storage unit. A person may use an externally accessible touch screen interface coupled to the frame and accessible through the housing to select a desired storage bin. Selection of one storage unit with the touch screen interface activates the actuator, the first conveyor and the second conveyor to sequentially move the storage units within the interior of the frame such that the selected storage unit is presented through the window. In this regard, a control circuit simultaneously coordinates the movement of the actuator, the first conveyor and the second conveyor. Preferably, the actuator, the first conveyor and the second conveyor are power-driven. One or more sensors disposed within the interior of the frame may determine the position of one or more of the storage units, the upper conveyor or the lower conveyor. The sensor may include a proximity sensor or a limit switch.

The storage units themselves may include one or more storage bins for storing goods. Each of the storage bins are also preferably wheelless to reduce the number of moving parts used in the storage and retrieval system. In one embodiment, a bin deployment mechanism coupled to the frame may be designed to push one or more of the storage bins out from within the frame for presentation to the user through the window. This provides better accessibility to the contents of the storage bins in the storage units. As such, the storage bins should slidably reside within the storage unit.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 22 is an enlarged view taken about the circle 22 in FIG. 20, illustrating an arm and a spring-tensioned solenoid deployment mechanism;

FIG. 23 is a view similar to FIG. 22, illustrating initial deployment of the arm;

FIG. 24 is a view similar to FIGS. 22 and 23, illustrating full deployment of the arm;

FIG. 33 illustrates downward movement of the storage units in the right-hand column followed by movement of the upper conveyor and associated storage unit from the right-hand column to the left-hand column;

FIG. 34 illustrates raising the left-hand column storage units for engagement with the storage unit on the upper conveyor;

FIG. 35 illustrates lowering the left-hand column of storage units to permit moving the upper conveyor to a neutral position;

FIG. 36 illustrates raising all of the storage units in the left-hand column but the storage unit on the lower conveyor and raising all of the storage units in the right-hand column;

FIG. 37 illustrates movement of the storage unit on the lower conveyor from the left-hand column to the right-hand column;

FIG. 38 illustrates lowering the storage units in the left-hand column;

FIG. 39 illustrates raising the storage units in the right-hand column off the lower conveyor;

DETAILED DESCRIPTION OF THE PREFERRED EMBODIMENTS

As shown in the accompanying drawings for purposes of illustration, the present invention for a storage and retrieval system is referred to generally by the reference number 10. This system 10 is intended to maximize the storage capacity anywhere in a home or business, and allow for easy access and retrievability for anyone whether that person be tall, short or handicapped, such as in a wheelchair. As will be more fully discussed herein, the design and configuration of the system 10 is not complex so as to not be overly expensive or prone to breakage and maintenance.

Figure 1:
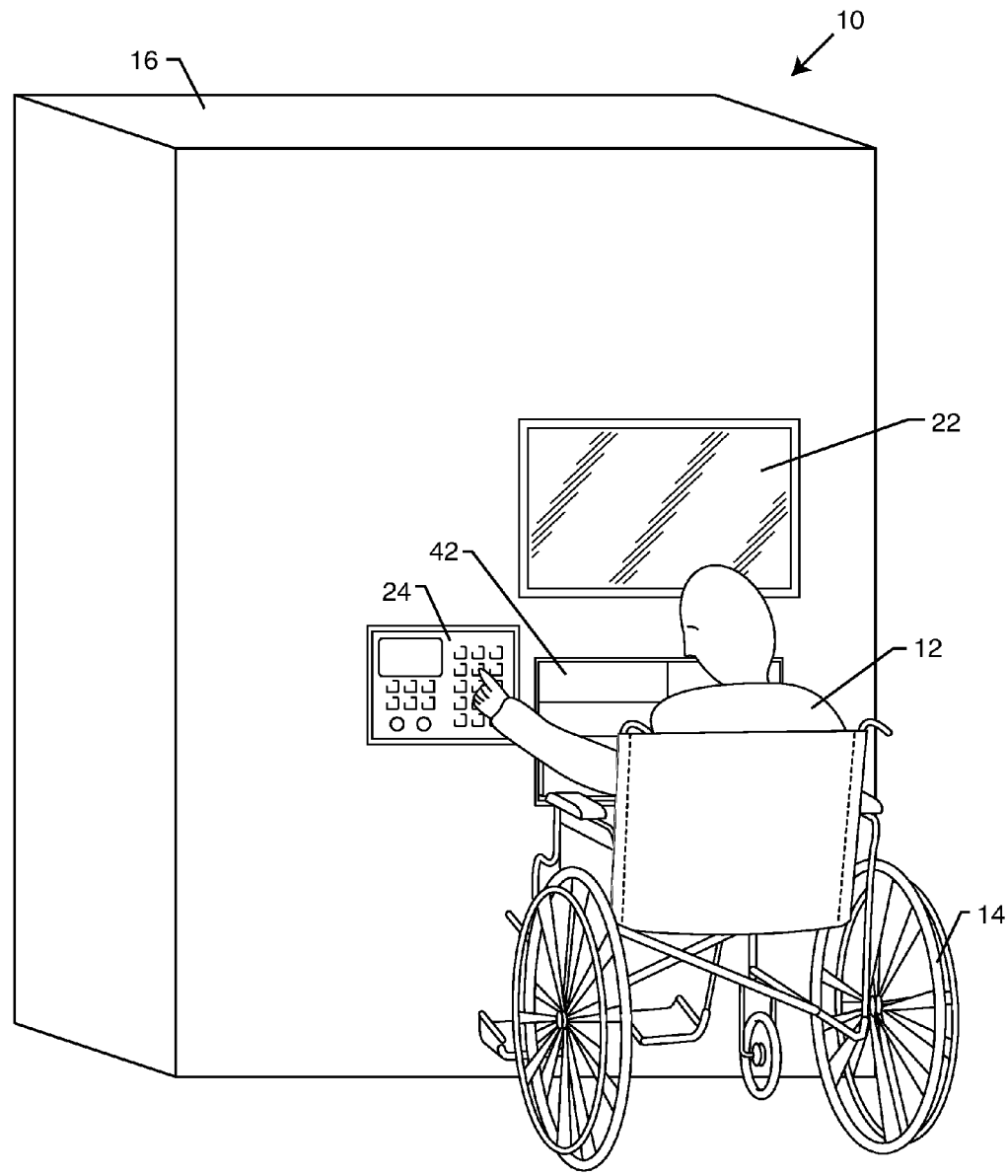
FIG. 1 is a front perspective view of a storage and retrieval system in accordance with the present invention.

In FIG. 1, the storage and retrieval system 10 is shown as a generally box-like structure that provides easy accessibility for a user 12, especially for the user 12 in a wheelchair 14. The storage and retrieval system 10 includes a housing 16 that covers a frame 18 (FIG. 3) and insulates each of the plurality of storage units 20 positioned therein. In one embodiment, the storage and retrieval system 10 includes an LCD screen 22 (or other comparable display device) that displays information to the user 12. Such information may include the contents within the storage and retrieval system 10. More specifically, such information may detail the quantity and location of items stored within the storage units 20. The LCD screen 22 may also provide other system information regarding the operation and inventory control of items placed within the storage and retrieval system 10. The user 12 operates the storage and retrieval system 10 through a touch screen interface 24. The touch screen interface 24 may include a QWERTY keyboard, numbers and other symbols so that the user 12 may enter information into the storage and retrieval system 10. Entering information is useful for controlling and identifying the inventory within the storage and retrieval system 10, in addition to later retrieving articles placed therein. In one embodiment, the options selected on the touch screen interface 24 are displayed to the user 12 on the LCD screen 22.

Figure 2:
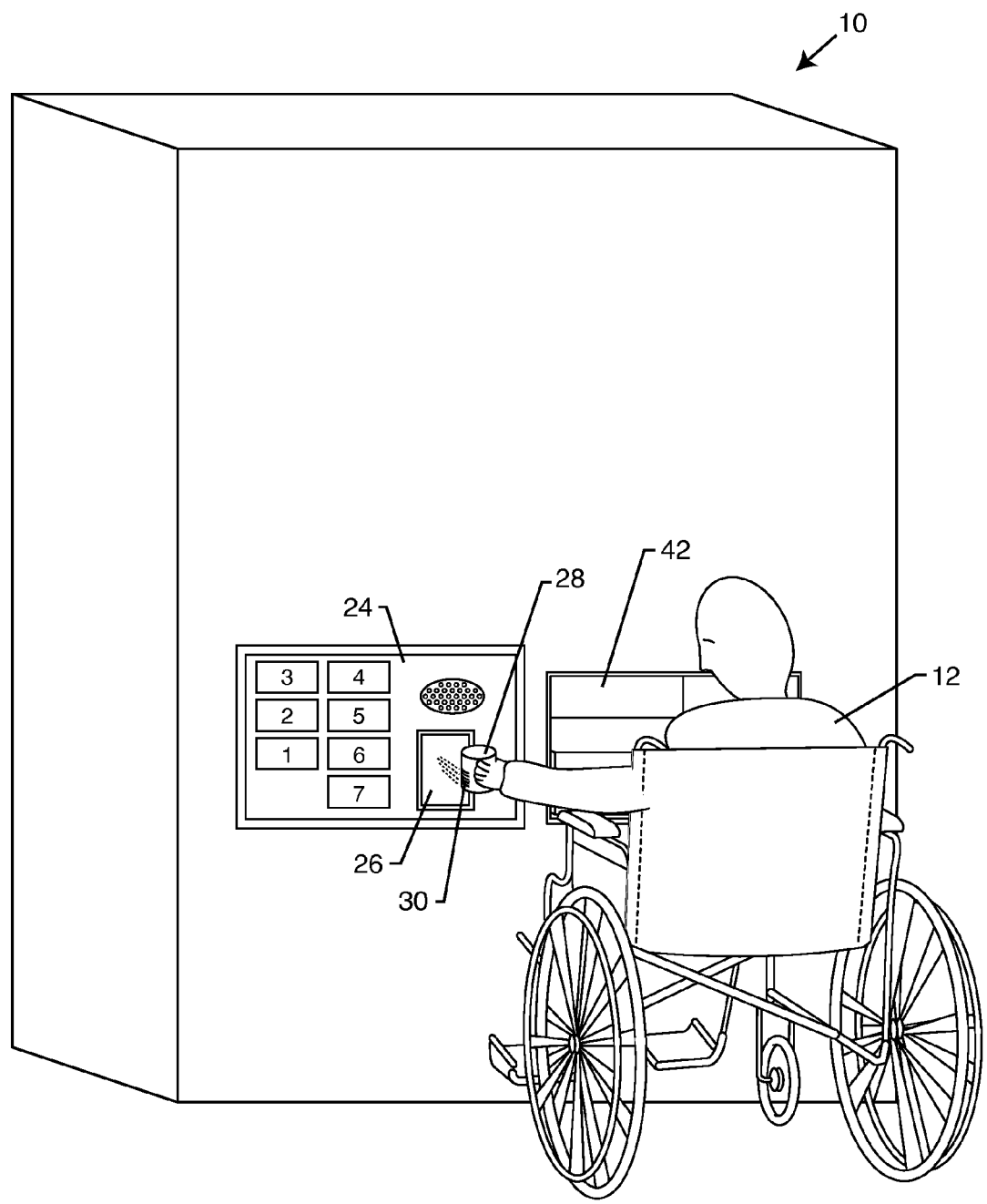
FIG. 2 is an alternative front perspective view of the storage and retrieval system, illustrating a handicap user interacting with a touch screen.

FIG. 2 is an alternative embodiment of the storage and retrieval system 10 wherein the user 12 may utilize a scanner 26 integrated into the touch screen 24 for entering items, such as a can 28, into one of the storage units 20. Here, the scanner 26 reads a barcode 30 disposed on the can 28. Information read from the barcode 30 is stored within the storage and retrieval system 10 and associated with a particular storage unit 20 in which the can 28 is stored. This enables the user 12 to later use the touch screen interface 24 to search for particular items within the storage and retrieval system 10. Upon finding the desired good, such as the can 28, the user 12 may utilize the touch screen interface 24 to automatically retrieve the can 28 from within the storage unit 20, in accordance with the embodiments described below. As also shown with respect to FIG. 2, the user 12 may identify the sequential order of the storage units 20 within the storage and retrieval system 10 via the display of the touch screen interface 24.

Figure 3:
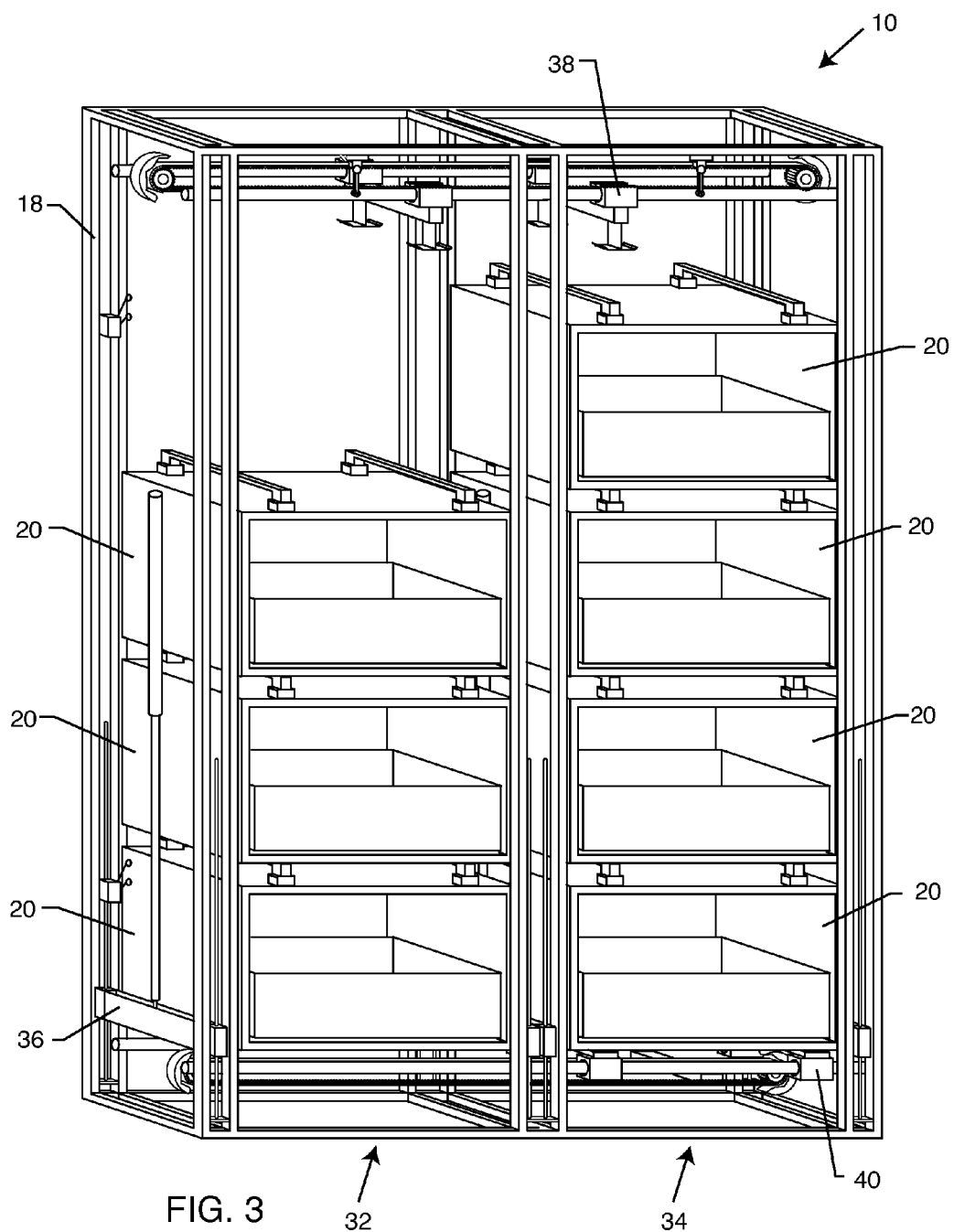
FIG. 3 is a perspective view of a plurality of storage units stacked within adjacent columns within the frame of the storage and retrieval system.

FIG. 3 illustrates the internal operation of the storage and retrieval system 10. As shown, the storage and retrieval system 10 includes a frame 18 that houses a plurality of the storage units 20. In this embodiment, the storage and retrieval system 10 includes a left-hand vertical track 32 and a right-hand vertical track 34 that permits the storage units 20 to move sequentially therein and between each column. The left-hand vertical track 32 generally includes the part of the frame 18 that houses each of the storage units 20 in the left-hand column of the frame 18. Likewise, the right-hand vertical track 34 generally includes the part of the frame 18 that houses each of the storage units 20 in the right-hand column of the frame 18. In FIG. 3, there are three storage units 20 in the left-hand vertical track 32 (with room for a fourth) and four storage units 20 in the right-hand vertical track 34. In this embodiment, the tracks 32, 34 are configured to retain a maximum of four storage units 20 at any given time. However, a person of ordinary skill in the art will readily recognize that the frame 18 and the tracks 32, 34 can include many different configurations for retaining one or more of the storage units 20 therein. The storage units 20 may be vertically displaced within each track 32, 34 by an actuator 36. The actuator 36 includes a mechanism, as described in detail below, for engaging and displacing one or more of the storage units 20 to permit sequential movement of the storage units 20 through the interior of the frame 18.

The storage and retrieval system 10 further includes an upper conveyor 38 and a lower conveyor 40, both being used to further facilitate the sequential movement of the storage units 20. Coordinated movement of the actuators 36, the upper conveyor 38 and the lower conveyor 40 enables sequential clockwise or counterclockwise movement of each of the storage units 20 within the interior of the frame 18. This is important because the storage and retrieval system 10 needs to be able to selectively reposition each one of the storage units 20 therein for presentation out through a common window 42 that is easily accessible by the user 12. As shown in FIGS. 1 and 2, the window 42 is presented approximately at the height of the user 12 sitting in the wheelchair 14. This particular feature enables the user 12 to store more goods inside of the storage and retrieval system 10 than would otherwise be capable of storing because the user 12 is restricted to the wheelchair 14. For example, the user 12 would not be able to reach items stored in a position substantially higher than the window 42. Thus, the advantages of the storage and retrieval system 10 become readily apparent as the design is not only user friendly, but also able to enhance efficient storage of items within the storage units 20. In this regard, the aforementioned touch screen interface 24 may automatically select an ideal storage unit 20 for placement of, for example, the can 28. When the user 12 endeavors to place the can 28 into the storage and retrieval system 10, the storage and retrieval system 10 automatically determines which storage unit 20 best matches the size, shape and type of goods associated with the can 28 for efficient storage within the storage and retrieval system 10.

Figure 4:
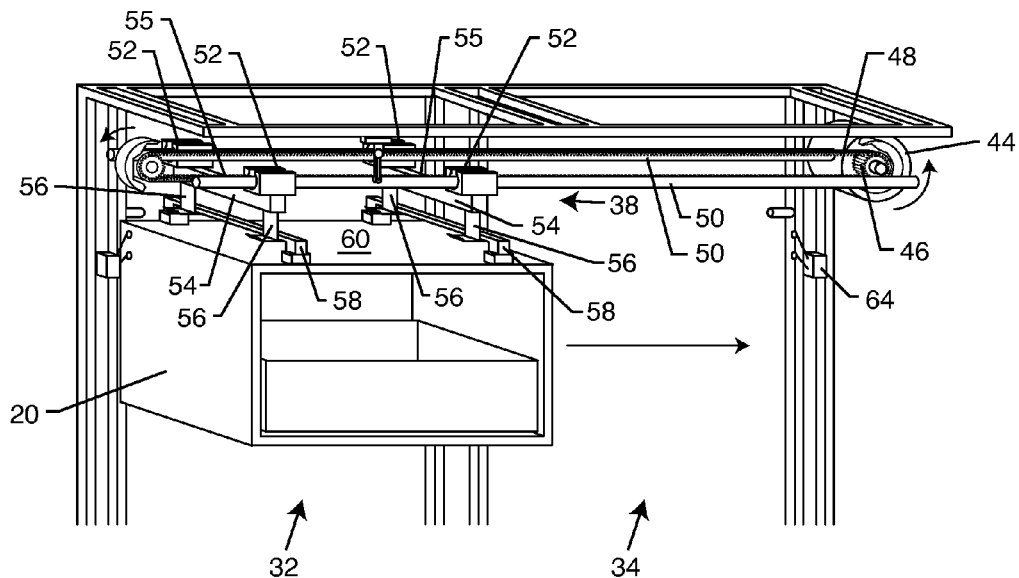
FIG. 4 is an enlarged perspective view of an upper conveyor engaged with a storage unit in one column.

FIG. 4 is an enlarged perspective view showing operation of the upper conveyor 38. The upper conveyor 38 is driven by a motor 44 coupled to a gear 46. The gear 46 is then coupled to a band 48 having a plurality of teeth that engage the gear 46. The band 48 is then coupled to the upper conveyor 38 such that rotation of the gear 46 by the motor 44 causes the upper conveyor 38 to move as instructed. Specifically, the upper conveyor 38 is coupled to a pair of horizontal upper support rails 50 by a set of couplers 52. The couplers 52 are commonly connected by a bridge 54 disposed therebetween. The band 48 attaches to the bridges 54 at a midpoint 55 between the couples 52. The band 48 is preferably fixedly attached to the bridges 54. For example, the band 48 may be stapled, welded, or otherwise chemically adhered (e.g. by an adhesive) to the bridges 54. The band 48 couples to the midpoint 55 of the bridges to balance the load along the upper conveyor 38 so the couplers 52 can merely slide relative to the upper support rails 50 when the motor 44 rotates the gear 46. A set of hooks 56 hang down from the bridges 54 and provide a mechanism for engaging a catch 58 formed along a top surface 60 of the storage unit 20. As will be described in more detail below, the upper conveyor 38 positions itself above the top surface 60 of the storage unit 20 such that the storage unit 20 can be raised for engagement with the hooks 56 shown in FIG. 4.

Figure 5:
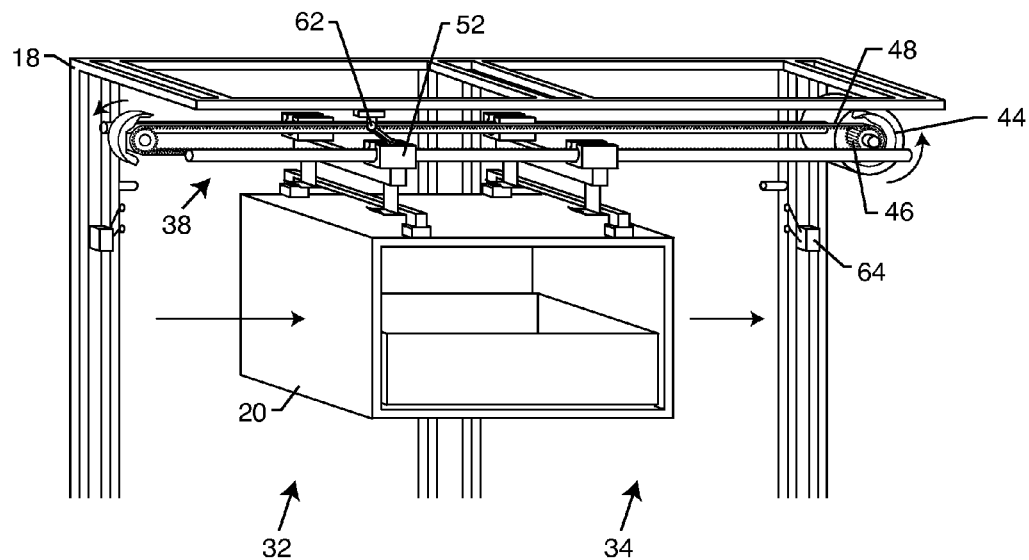
FIG. 5 is an enlarged perspective view similar to that of FIG. 4, illustrating movement of the storage unit from one column to another.
Figure 6:
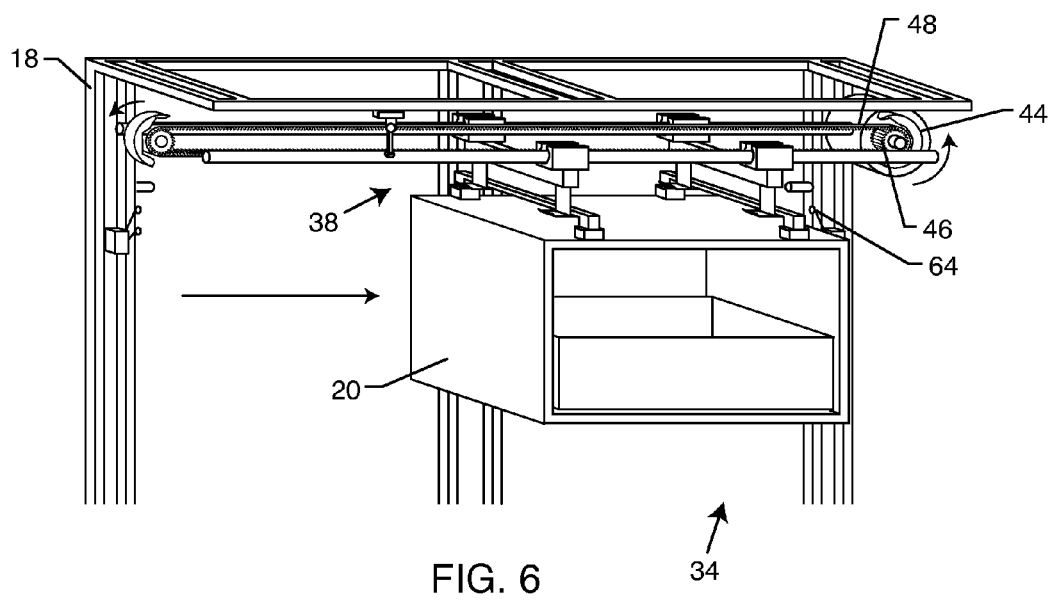
FIG. 6 is another enlarged perspective view, further illustrating movement of the storage unit to the opposite column.

FIGS. 5 and 6 illustrate left to right horizontal movement of the storage unit 20. In these embodiments, the motor 44 rotates counterclockwise such that the gear 46 causes the band 48 to rotate in a manner that causes the storage unit 20 attached to the upper conveyor 38 to move from the left-hand vertical track 32 to the right-hand vertical track 34. One of the couplers 52 may activate a position sensor 62 coupled to the frame 18 as the upper conveyor 38 moves the storage unit 20 to the right-hand vertical track 34. The position sensor 62 is primarily used to reset the positioning of the upper conveyor 38 between the left-hand vertical track 32 and the right-hand vertical track 34. In this position, the upper conveyor 38 does not interfere with the raising or lowering of any of the storage units 20 as described below.

Figure 7:
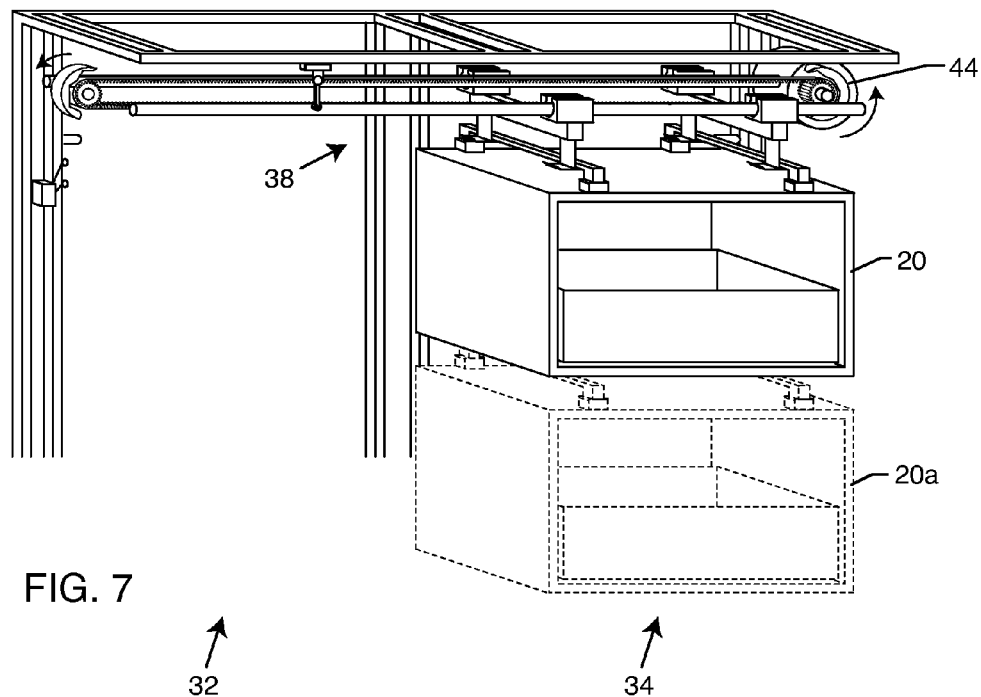
FIG. 7 is an enlarged perspective view illustrating the positioning of the storage unit connected to the upper conveyor above a second storage unit in phantom.

FIG. 7 illustrates the positioning of the storage unit 20 in the right-hand vertical track 34. A limit switch 64 (best shown in FIGS. 4-6) may gage the horizontal positioning of the storage unit 20 as the upper conveyor 38 moves from the left-hand vertical track 32 to the right-hand vertical track 34. That is, the limit switch 64 relays a signal to a control circuit that operates the upper conveyor 38 that the final positioning that the storage unit 20 is now in the right-hand vertical track 34. At that point, the control circuit will stop the motor 44 to prevent any further movement of the upper conveyor 38. Here, the storage unit 20 is positioned above a plurality of other storage units (shown in FIG. 7 as storage unit 20a in phantom) so that the storage unit 20 can be released from the upper conveyor 38. The sequence described above with respect to movement of the upper conveyor 38 from the left-hand vertical track 32 to the right-hand vertical track 34 is equally applicable in the reverse for engaging the storage unit 20 and moving it from the right-hand vertical track 34 to the left-hand vertical track 32 through opposite clockwise rotation of the motor 44, the gear 46 and the band 48 connected to the upper conveyor 38.

Figure 8:
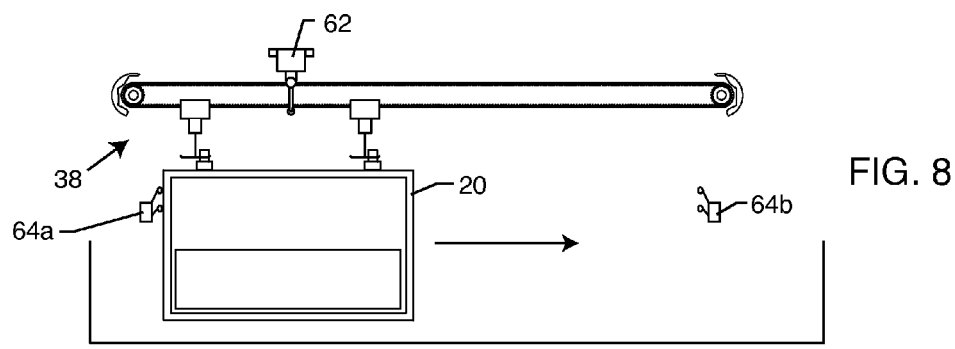
FIG. 8 is a side view of the upper conveyor, illustrating movement of the storage unit from left to right.
Figure 9:
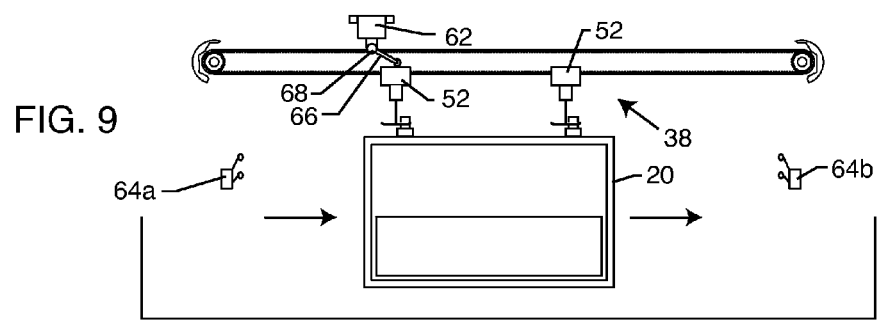
FIG. 9 is a side view similar to FIG. 8, further illustrating the storage unit actuating a position sensor.

FIGS. 8-11 more specifically illustrate the relative positioning of the storage unit 20 to the limit switches 64 and the position sensor 62. In FIG. 8, the storage unit 20 is flush with the limit switch 64a, which denotes that the storage unit 20 is located within the left-hand vertical track 32 (FIG. 4). The motor 44 activates to start moving the upper conveyor 38 from the left-hand vertical track 32 to the right-hand vertical track 34, as described above. As the storage unit 20 moves from left to right, the coupler 52 activates a switch 66. The switch 66 rotates about a pivot 68 when the coupler 52 comes in contact. This may activate the position sensor 62 when the upper conveyor 38 moves either from left to right or right to left. The position sensor 62 may relay information to the control circuit regarding the relative positioning of the upper conveyor 38. In this respect, it is preferable that the upper conveyor 38 remains in position between the left-hand vertical track 32 and the right-hand vertical track 34 when not in use.

Figure 10:
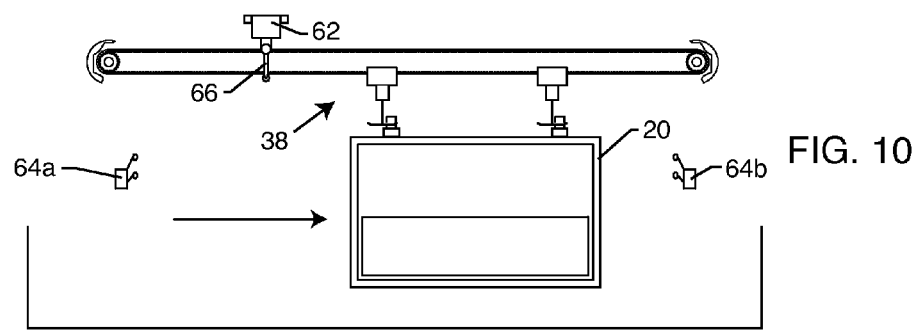
FIG. 10 is a side view further illustrating movement of the storage unit from one column to another column.
Figure 11:
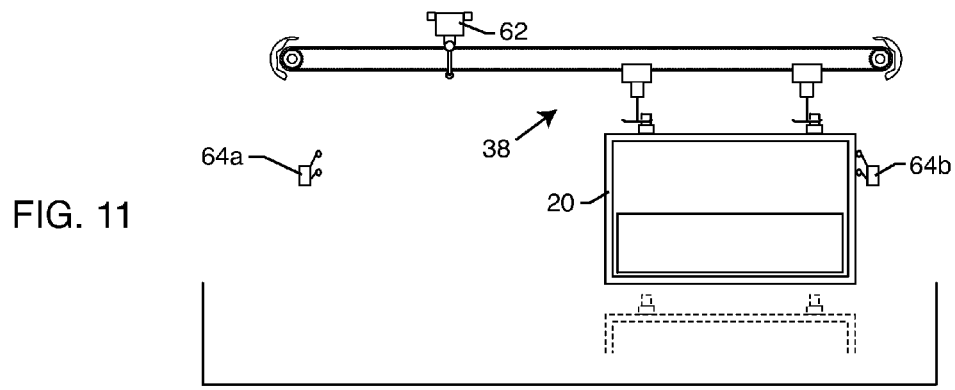
FIG. 11 is a side view of the upper conveyor positioning the storage unit in an opposite column.

FIG. 10 illustrates further movement of the storage unit 20 toward the right-hand vertical track 34. Here, the coupler 52 is no longer engaged with the position sensor 62 such that switch 66 is again in a vertical position. The storage unit 20 continues to move toward the right-hand vertical track 34 until it contacts the limit switch 64b. At this point, the limit switch 64b relays a signal to the control circuit indicating that the limit switch 64b has been tripped and that the storage unit 20 is aligned in the right-hand vertical track 34. The control circuit then shuts off the motor 44 so that the upper conveyor 38 stops moving. Of course, a person of ordinary skill in the art will readily recognize that the aforementioned movement of the storage unit 20 from the left-hand vertical track 32 to the right-hand vertical track 34 may be accomplished in the reverse.

Figure 12:
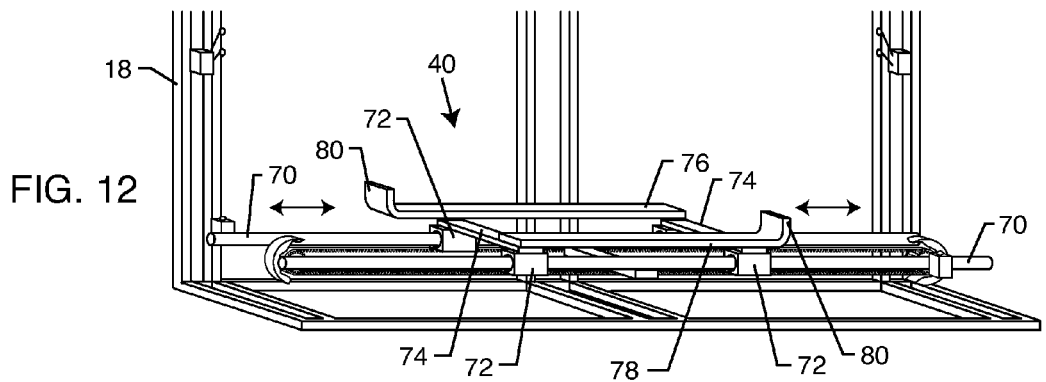
FIG. 12 is an enlarged perspective partial cut-away of a lower conveyor.
Figure 13:
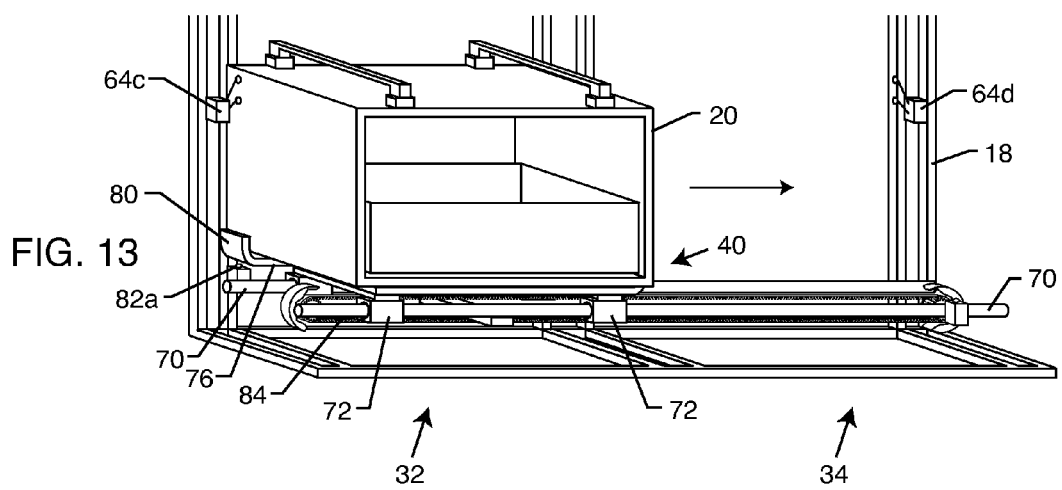
FIG. 13 is a perspective view similar to FIG. 12, illustrating a storage unit on the lower conveyor.
Figure 14:
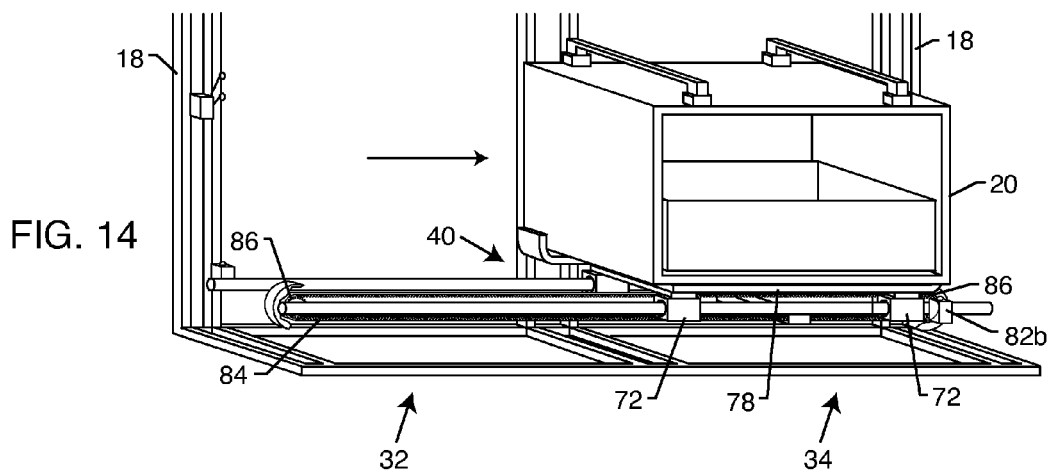
FIG. 14 is a perspective view similar to FIGS. 12 and 13, illustrating movement of the storage unit from one column to another column on the lower conveyor.

FIGS. 12-14 illustrate movement of the lower conveyor 40. The lower conveyor 40, like the upper conveyor 38, is mounted to a pair of lower support rails 70 rigidly attached to the frame 18. The lower conveyor 40 also includes a set of couplers 72 that slide relative to the lower support rails 70. Likewise, a bridge 74 spans between couplers 72 to ensure consistent sliding motion along the lower support rails 70. Preferably, the couplers 72 have a low friction material disposed therein to facilitate such sliding motion relative to the lower support rails 70. Additionally, a rear skid 76 and a front skid 78 span respective couplers 72 to, in association with the bridges 74, form a frame that makes up the lower conveyor 40. Each of the skids 76, 78 include a vertical extension 80 that retains the storage unit 20 thereon during movement.

FIGS. 13-14 illustrate the storage unit 20 disposed on the lower conveyor 40. As shown, the vertical extension 80 of the rear skid 76 extends over a proximity switch 82a such that the controller knows the specific positioning of the lower conveyor 40. Likewise, the limit switch 64c activates when the storage unit 20 is in the position shown in FIG. 13. The controller, therefore, knows that the storage unit 20 and the lower conveyor 40 are in the position shown in FIG. 13. Like the upper conveyor 38, the system controller activates a motor (not shown) that causes a gear set to turn clockwise or counterclockwise depending whether the storage unit 20 is being moved from the right-hand vertical track 34 to the left-hand vertical track 32 or vice versa. In the case of moving the storage unit 20 from the position shown in FIG. 13 to the position shown in FIG. 14, the motor rotates the gear and associated band 84 counterclockwise. In this regard, the band 84 is attached to each of the bridges 74 and horizontally displaces the lower conveyor 40 upon activation of the motor and movement of a set of gears 86. The lower conveyor 40 moves the storage unit 20 from the left-hand vertical track 32 to the right-hand vertical track 34 (i.e. the position shown in FIG. 14). The controller knows to stop operation of the motor when the vertical extension 80 of the front skid 78 activates the proximity switch 82b mounted to the frame 18. The controller will also realize that the storage unit 20 is in the position shown in FIG. 14 through actuation of the limit switch 64d (best shown in FIG. 13).

Figure 15:
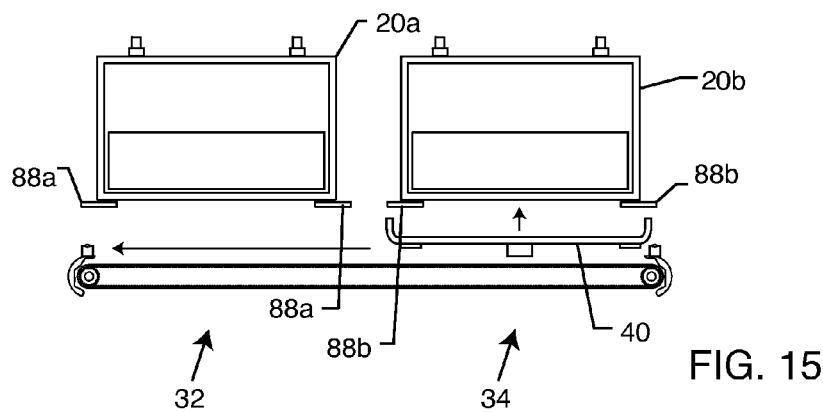
FIG. 15 is a schematic view illustrating one storage unit in a right-hand column being raised off the lower conveyor so the lower conveyor can move to the left-hand column.
Figure 16:
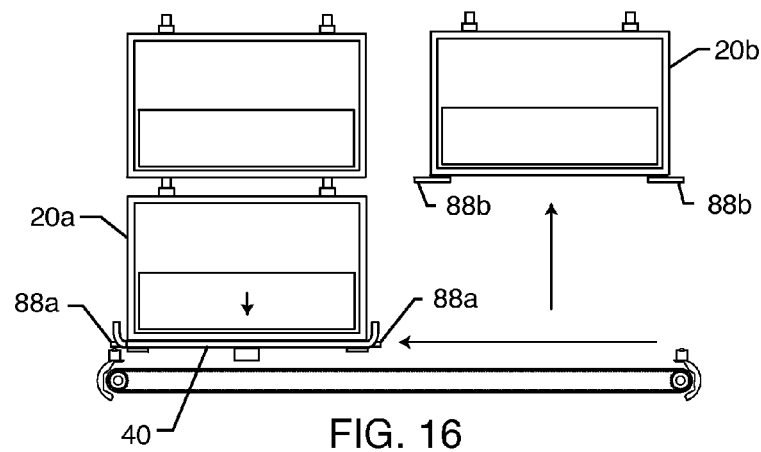
FIG. 16 is a schematic view illustrating the storage unit in the left-hand column being placed on the lower conveyor and the storage unit in the right-hand column being raised.
Figure 17:
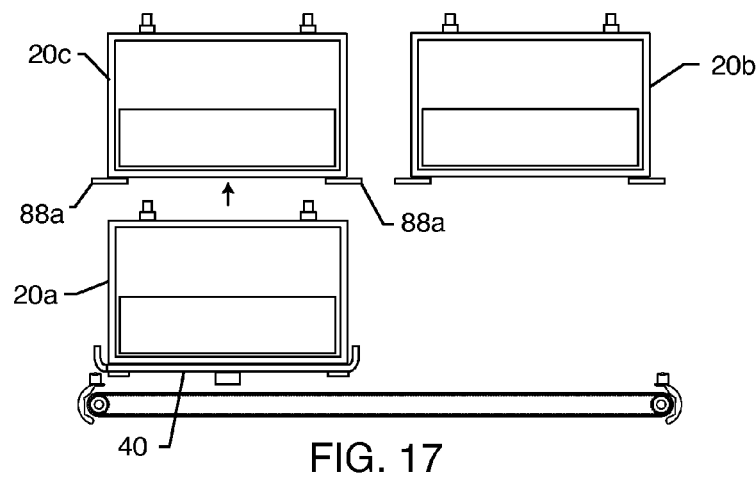
FIG. 17 is a schematic view illustrating removal of an upper storage unit in the left-hand column from the top of the storage unit on the lower conveyor.
Figure 18:
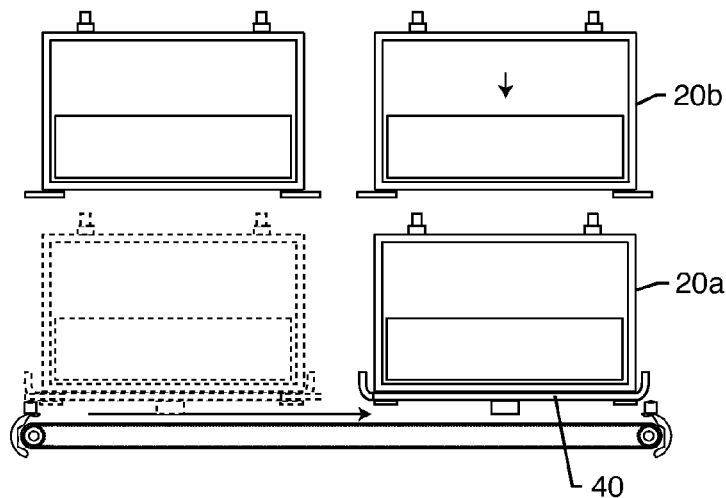
FIG. 18 is a schematic view illustrating movement of the storage unit on the lower conveyor from the left-hand column to the right-hand column.
Figure 19:
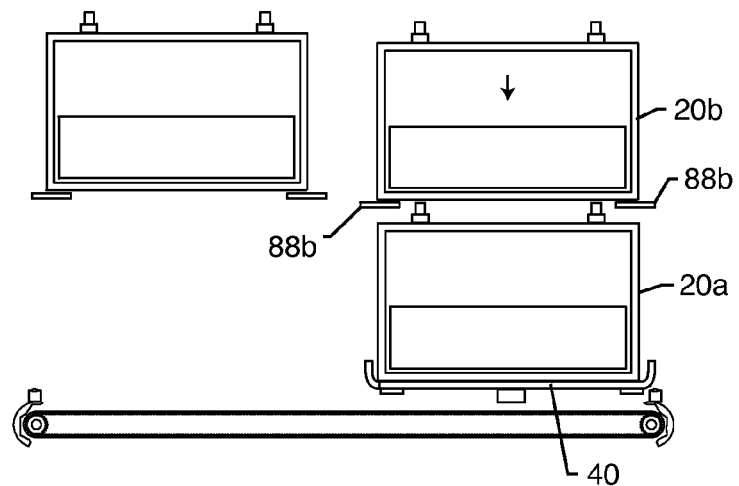
FIG. 19 is a schematic view illustrating lowering the upper storage unit in the right-hand column onto the storage unit on the lower conveyor.

FIGS. 15-19 illustrate sequential movement of a plurality of the storage units 20 through use of the actuator 36 (not shown therein) and the lower conveyor 40. In FIG. 15, the storage unit 20a is shown in the left-hand vertical track 32 and the storage unit 20b resides in the right-hand vertical track 34. To start, the storage unit 20b is lifted off the lower conveyor 40 by engaging a pair of arms 88b underneath the storage unit 20b. The arms 88b and the operation of the actuator 36 are described below in more detail. In FIG. 15, the arms 88b raise the storage unit 20b high enough to provide enough clearance for the lower conveyor 40 to move out from underneath the storage unit 20b. Similarly, the arms 88a support the storage unit 20a in the left-hand vertical track 32 at a height that provides enough clearance so the lower conveyor 40 can move underneath the storage unit 20a. FIG. 16 illustrates lowering the storage unit 20a onto the lower conveyor 40 once the lower conveyor 40 is positioned underneath. This is accomplished wherein the actuator 36 lowers the arms 88a to a position such that the lower conveyor 40 supports the storage unit 20a. Also shown in FIG. 16 is the raising of the storage unit 20b to a position that provides enough clearance to reposition the storage unit 20a thereunder. Accordingly, in order to move the storage unit 20a underneath the storage unit 20b, the arms 88a disengage the storage unit 20a, are moved upwardly by the actuator 36, and are redeployed underneath the storage unit 20c. Thereafter, the storage unit 20c is lifted to provide clearance to move the storage unit 20a from the position shown in FIG. 17 to the position shown in FIG. 18. In FIG. 18, the storage unit 20a is shown positioned underneath the storage unit 20b. The next step is to lower the storage unit 20b on top of the storage unit 20a. This is accomplished by lowering the arms 88b through deployment of the actuator 36 coupled thereto.

Figure 20:
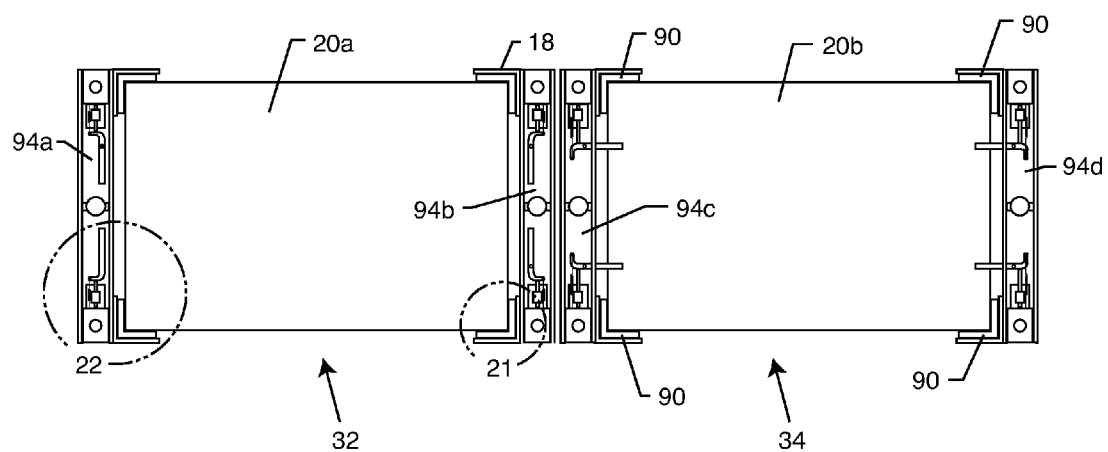
FIG. 20 is a bottom-up view, illustrating the positioning of the storage units within the vertical tracks.
Figure 21:
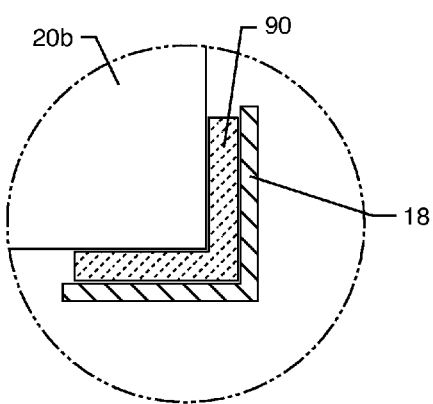
FIG. 21 is an enlarged view taken about the circle 21 in FIG. 20, illustrating the positioning of the storage unit against a low friction surface coupled to the vertical track.

FIG. 20 is a bottom-up view of the storage units 20a, 20b disposed within the left-hand vertical track 32 and the right-hand track 34 within the frame 18 of the storage and retrieval system 10. The storage units 20a, 20b reside in their respective tracks 32, 34 and are biased against a low-friction material 90 located within the interior of the frame 18. Low-friction material 90 is shown more specifically in the enlarged view of FIG. 21. The low-friction material 90 permits sliding movement of each of the storage units 20 relative to the frame 18 without causing unwanted binding or locking as the storage and retrieval system 10 sequentially moves the storage units 20 within the interior of the frame 18.

FIGS. 22-24 more specifically illustrate a spring-tensioned solenoid deployment mechanism 92. The mechanism 92 is designed to deploy the arm 88 into a position that can engage one of the storage units 20. The mechanisms 92 reside within respective channels 94a-94d (FIG. 20) outside of the left-hand vertical track 32 and the right-hand vertical track 34. This enables the storage units 20 to move freely within each respective track 32, 34 when the arm 88 is not deployed as shown in the position shown in FIG. 22. The arms 88 are deployed to vertically displace one or more of the storage units 20. This is accomplished by activating a solenoid 96 such that a ram 98 extends therefrom and contacts the arm 88. The arm 88 rotates about a pivot 100 through continued extension of the ram 98. A spring 102 is coupled to the housing of the solenoid 96 and an end 104 of the arm 88. Continued rotation of the arm 88 about the pivot 100 causes the arm 88 to stick out from within the channel 94 for engagement with one of the storage units 20. As shown in FIG. 24, the spring 102 stretches to accommodate the extended position of the end 104 relative to the positioning of the solenoid 96. Deactivating the solenoid 96 causes retraction of the ram 98. Accordingly, since there is no force being exerted on a portion of the arm 88, the spring 102 pulls the end 104 back toward the body of the solenoid 96, causing the arm 88 to rotate back about the pivot 100 to the position generally shown in FIG. 22. In this position, the arm 88 is no longer in a position to engage one or more of the storage units 20. The controller that operates the storage and retrieval system 10 determines when to activate the solenoid 96 in order to engage one or more of the storage units 20, as described in more detail below.

Figure 25:
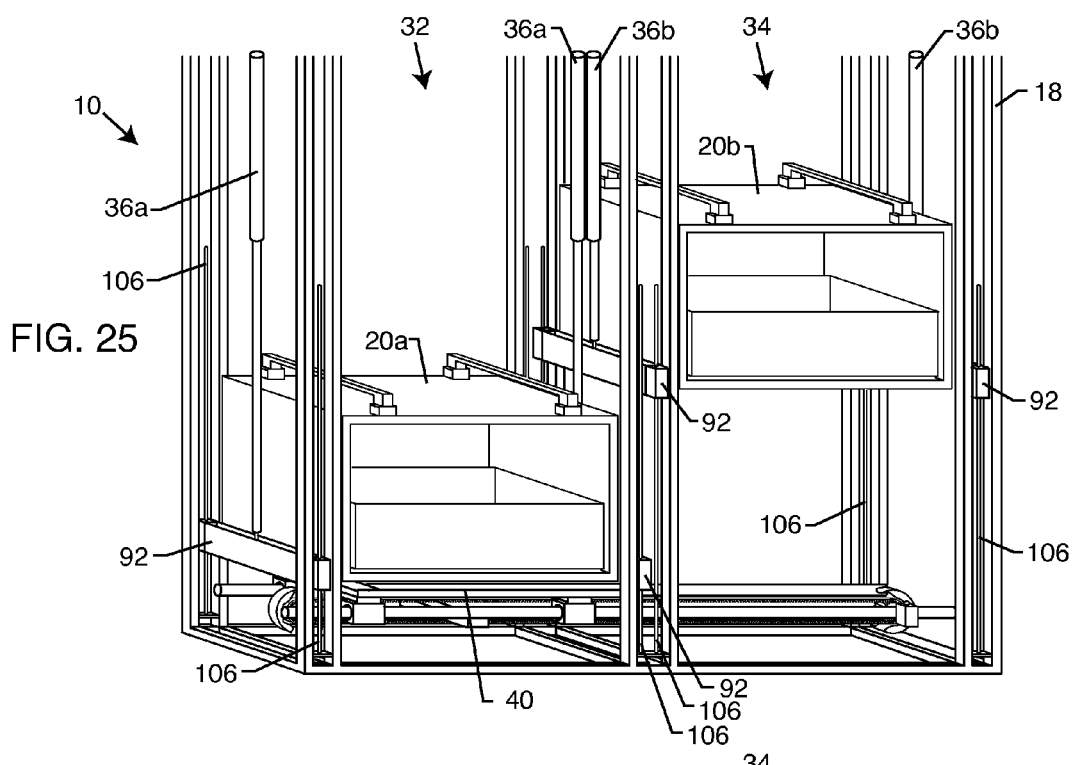
FIG. 25 is a perspective view illustrating the relative positioning of storage units in the first and second columns.
Figure 26:
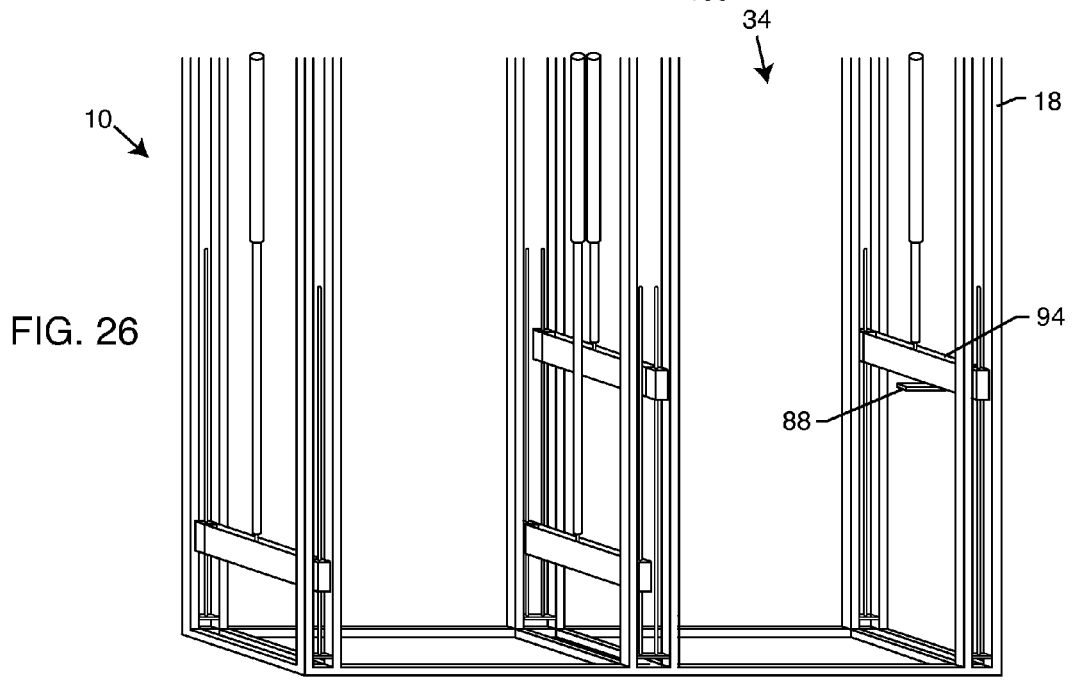
FIG. 26 is a perspective view similar to that of FIG. 25, illustrating the positioning of the actuators.

FIGS. 25-28 further illustrate the storage and retrieval system 10 as disclosed herein. Specifically, FIG. 25 illustrates the storage units 20a and 20b disposed in the respective left-hand vertical track 32 and the right-hand vertical track 34. Each track 32, 34 has an associated pair of actuators 36a, 36b disposed within the afore-described channels 94. The actuators 36a, 36b are each respectively connected to a spring-tension solenoid deployment mechanism 92 that moves vertically along a pair of guides 106 coupled to the frame 18. Since the storage unit 20a in FIG. 25 resides on the lower conveyor 40, FIG. 26 (which does not show the storage unit 20a) does not illustrate deployment of the arms 88 out from within the channels 94. Alternatively, since the arms 88 retain the storage unit 20b in the raised position shown in FIG. 25, FIG. 26 illustrates the arm 88 extending out from within the channel 94 and into the right-hand vertical track 34 for engagement underneath the storage unit 20b.

Figure 27:
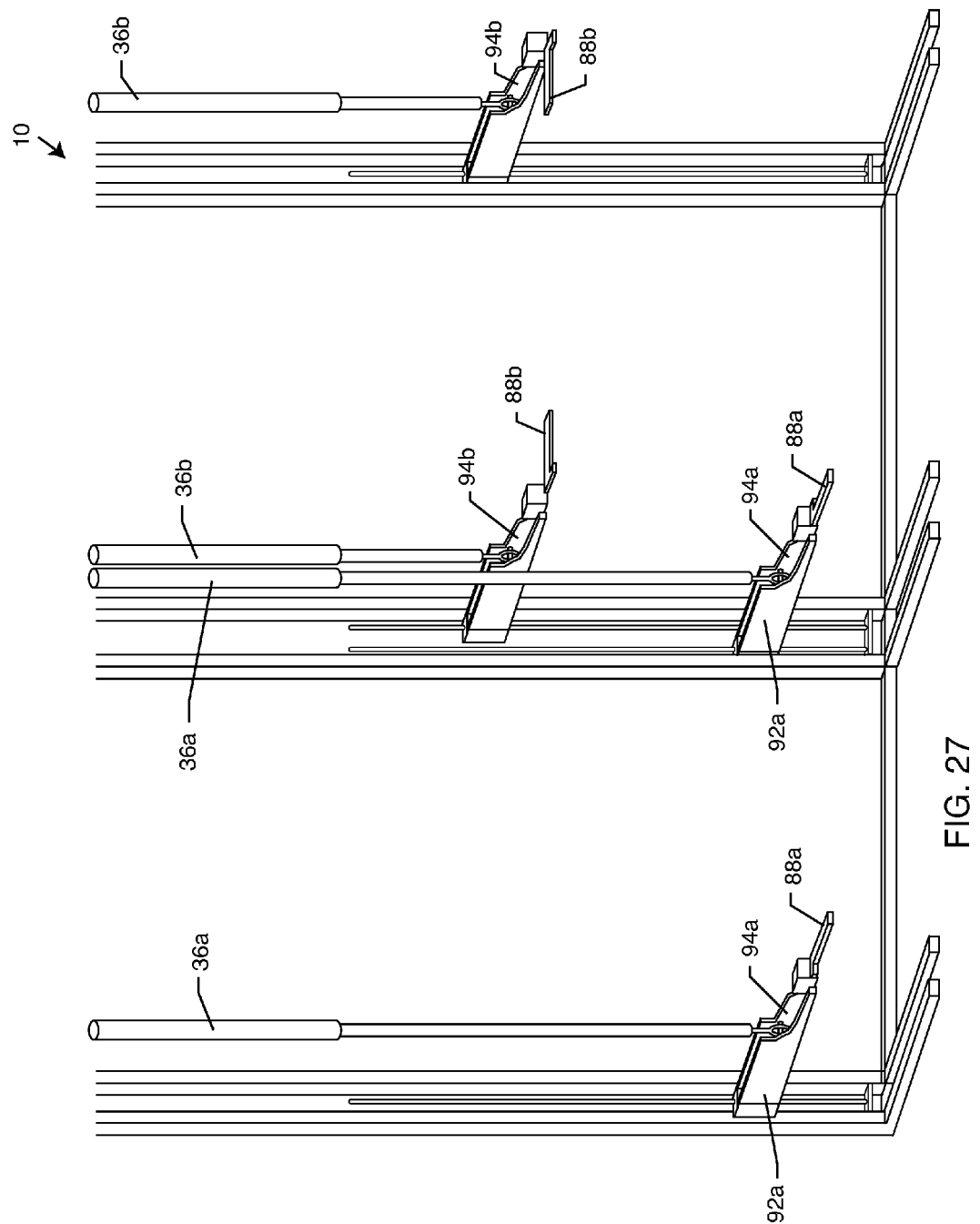
FIG. 27 is a perspective partial cut-away view, further illustrating disengagement of the arms in the left-hand column and engagement of the arms in the right-hand column.

FIG. 27 more specifically illustrates the relative positioning of the actuators 36a, 36b and the positioning of the arms 88a, 88b within or extending out from each respective channel 94. The arms 88a are shown in FIG. 27 as being parallel to the length of the spring-tension solenoid deployment mechanism 92a and thus within the channel 94. Accordingly, the storage unit 20a (FIG. 25) is not being supported by the actuators 36a via the arms 88a. Thus, the storage unit 20a resides on the lower conveyor 40 as shown in FIG. 25. The storage unit 20b, however, is being held up by the actuators 36b and the associated arms 88b. Accordingly, FIG. 27 illustrates the arms 88b extending out from within each respective channel 94b. Since the arms 88b extend into the right-hand vertical track 34, the arms 88b are able to support the storage unit 20b. The actuators 36b are then able to raise or lower the storage unit 20b.

Figure 28:
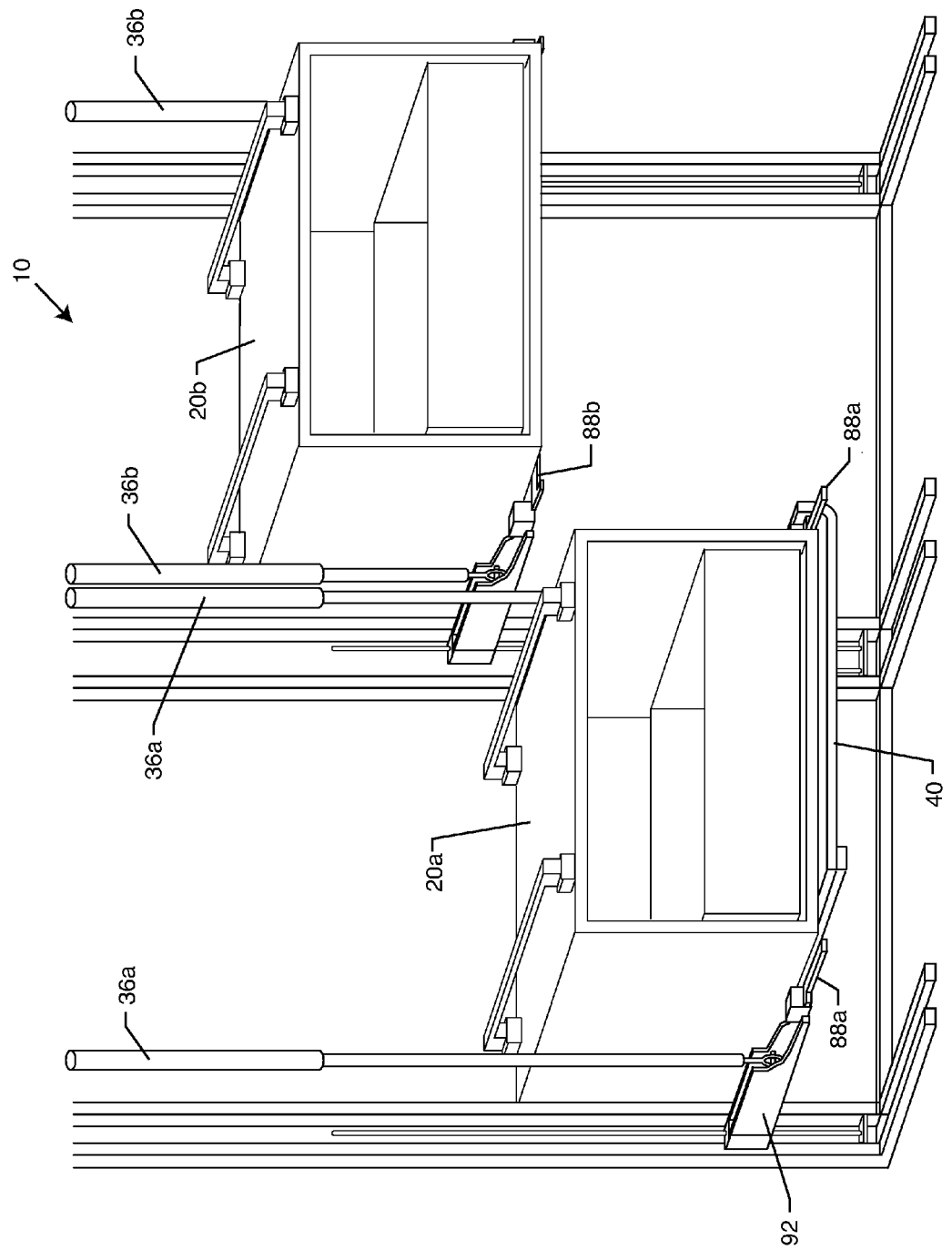
FIG. 28 is a perspective partial cut-away view similar to FIG. 27, illustrating the positioning of storage units with respect to the disengaged arms and engaged arms.

FIG. 28 more specifically illustrates the positioning of the storage unit 20a on the lower conveyor 40 when each of the arms 88a are in a disengaged position. In this position, the actuators 36a are free to vertically move the spring-tension solenoid deployment mechanism 92 without interference from the storage unit 20a. FIG. 28 also illustrates that the storage unit 20b is being supported by the arms 88b. The actuators 36b may vertically displace this storage unit 20b (and any other storage unit stacked on top) as necessary to perform sequential movement as described with respect to FIGS. 29-41 below.

Figures 29, 30:
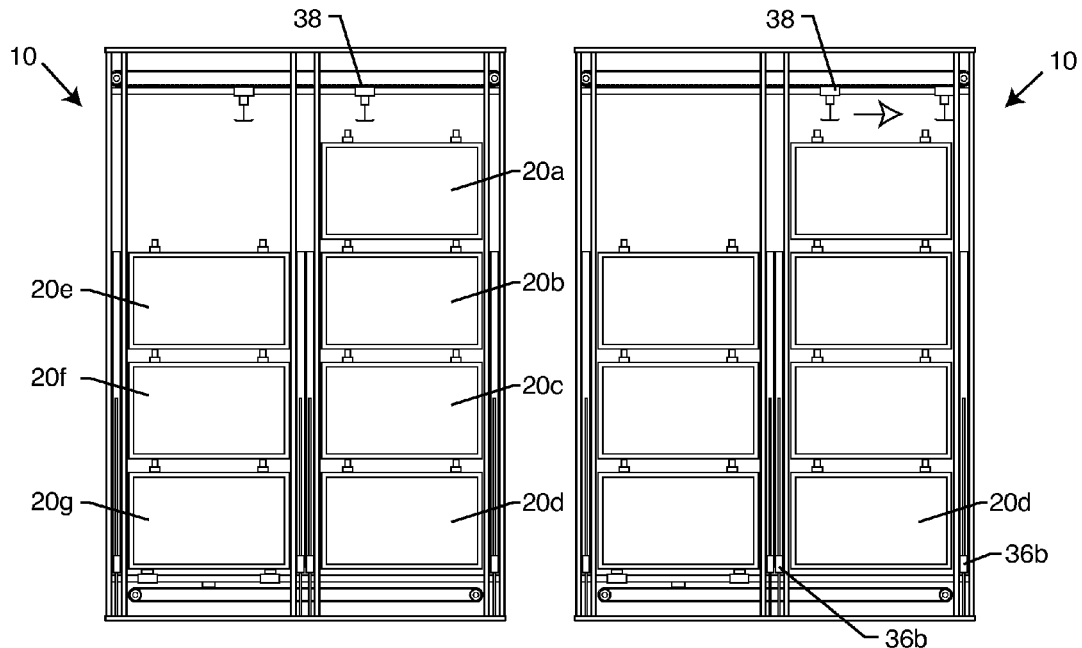
FIG. 29 is a front view of the internal compartments of the storage and retrieval system, illustrating three storage units in the left-hand column and four storage units in the right-hand column.
FIG. 30 illustrates movement of the upper conveyor to the right-hand column above the storage units.

FIGS. 29-41 illustrate one "cycle" of the storage units 20 in accordance with the operation of the storage and retrieval system 10. FIG. 29 illustrates the storage and retrieval system 10 in an initial position. To move the storage units 20 in a counterclockwise rotation, the first step is to move the upper conveyor 38 to the position shown in FIG. 30. After that, the actuators 36b raise the storage units 20 in the right-hand vertical track 34 to the position shown in FIG. 31 so that the upper conveyor 38 can engage the storage unit 20a. The actuators 36b raise the storage units 20 in the right-hand vertical track 34 after deploying the arms 88b underneath the storage unit 20d.

Figures 31, 32:
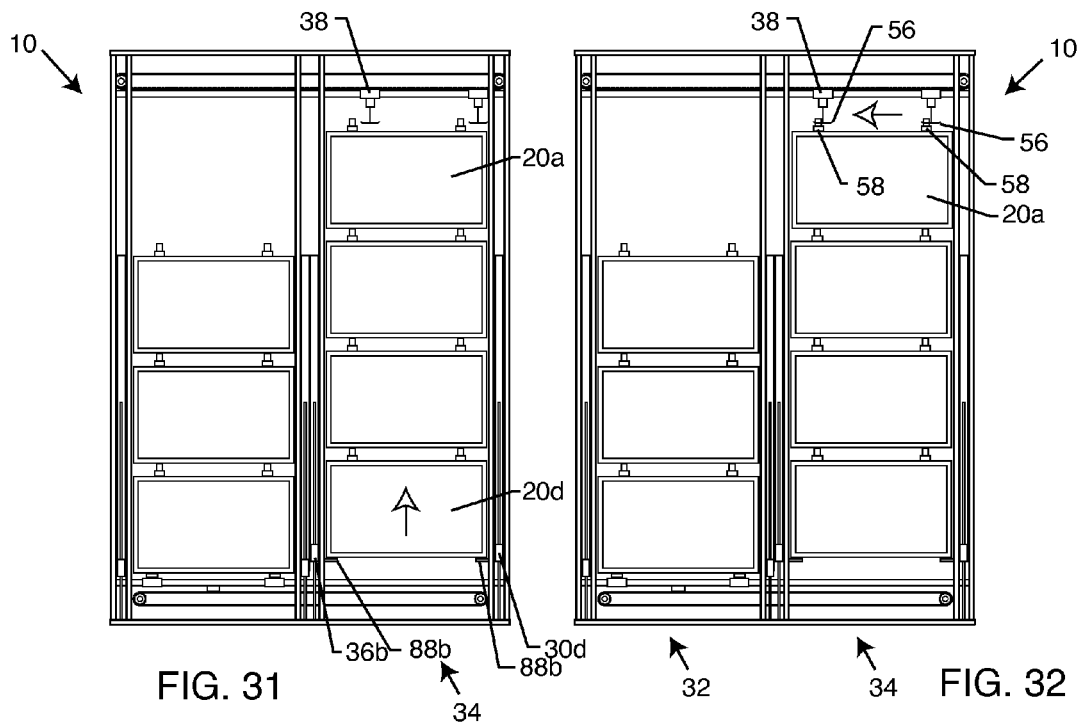
FIG. 31 illustrates movement of the storage units in the right-hand column to a position where the upper conveyor can engage the upper storage unit.
FIG. 32 illustrates engagement of the upper storage unit by the upper conveyor.

Next, the upper conveyor 38 moves to the left as shown by the direction arrow in FIG. 32. Here, the hooks 56 engage the catches 58 extending out from the top of the storage unit 20a. Each of the storage units 20 stacked in the left-hand vertical track 32 and the right-hand vertical track 34 rest upon and are supported by respective catches 58. Accordingly, once the hooks 56 engage the catches 58 in the storage unit 20a, the actuators 36b lower the remaining storage units 20b, 20c, 20d as shown in FIG. 33. This disengages the catches 58b of the storage unit 20b from the storage unit 20a. Accordingly, the upper conveyor 38 is then able to move the storage unit 20a from the position shown in phantom in FIG. 33 to the left-hand vertical track 32.

Thereafter, the actuators 36a raise the storage units 20e, 20f, 20g such that the catches 58e engage the bottom surface area of the storage unit 20a. Preferably, the actuators 36a raise the storage units 20e, 20f, 20g enough to partially lift the storage unit 20a off the hooks 56. Once off the hooks 56, the upper conveyor 38 is free to move back to a resting or initial position as shown in FIG. 29. As such, FIG. 35 illustrates movement of the upper conveyor 38 to the initial or resting position. The actuators 36a then lower the storage units 20a, 20e, 20f, 20g so that the storage unit 20g rests on the lower conveyor 40. Next, the arms 88a disengage from the storage unit 20g. After disengagement, the storage unit 20g is merely being supported by the lower conveyor 40. The actuators 36a then raise to a position just underneath the storage unit 20f. In the gap created by the height of the catch 58g, the spring-tension solenoid deployment mechanism 92 is able to deploy the arms 88a underneath the storage unit 20f. Thereafter, the deployed arms 88a support the storage unit 20f so that the actuators 36a can raise the storage units 20a, 20e, 20f as shown in FIG. 36. At the same time, the actuators 36b raise the storage units 20b, 20c, 20d to the position shown in FIG. 36 to provide clearance to move the storage unit 20g from the left-hand vertical track 32 to the right-hand vertical track 34. Accordingly, FIG. 37 illustrates movement of the storage unit 20g from the left-hand vertical track 32 to the right-hand vertical track 34 via the lower conveyor 40. The next step is to lower the storage units 20a, 20e, 20f by lowering the actuators 36a to the position shown in FIG. 38. At the same time, the actuators 36b lower the storage units 20b, 20c, 20d on top of the storage unit 20g placed thereunder. Once the storage unit 20d is supported by the catches 58g of the storage unit 20g, the arms 88b disengage from underneath the storage unit 20d so that the actuators 36b may reposition the spring-tension solenoid deployment mechanism 92 underneath the storage unit 20g.

Figures 40, 41:
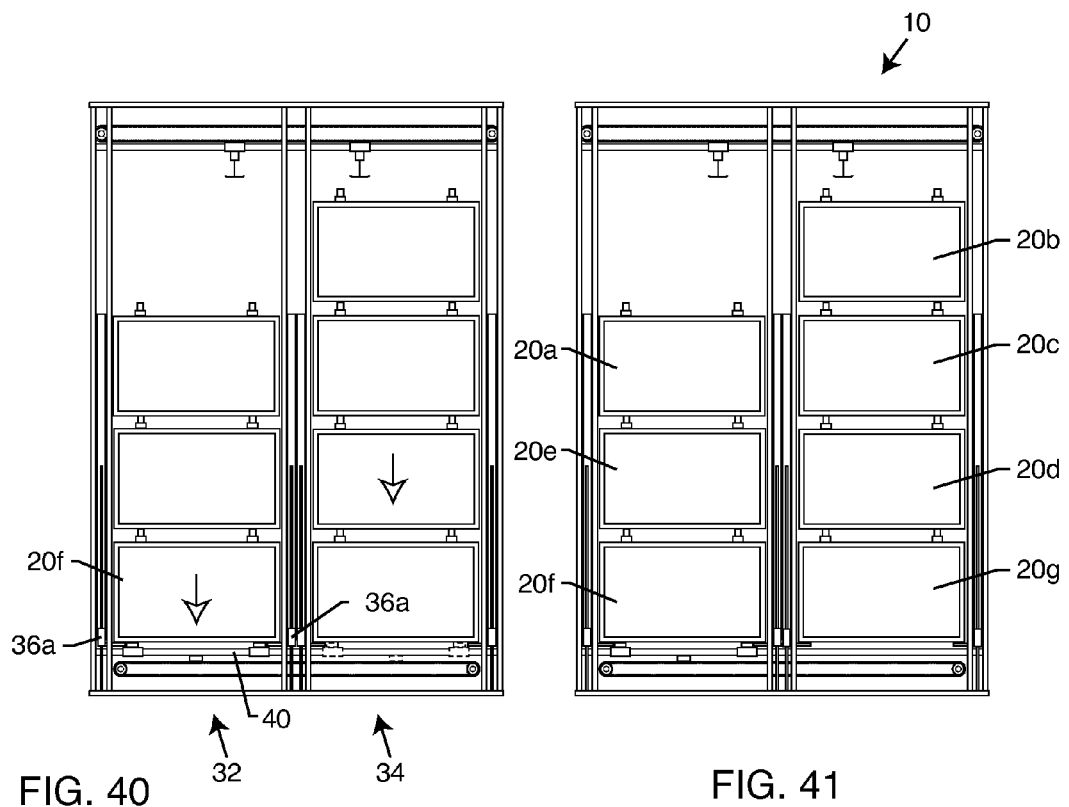
FIG. 40 illustrates lowering the storage units in left-hand column on top of the lower conveyor.
FIG. 41 illustrates the storage and retrieval system after one cycle of the storage units.

FIG. 39 illustrates the actuators 36b positioned such that the deployed arms 88b engage the bottom of the storage unit 20g in order to lift the storage units 20b, 20c, 20d, 20g off the lower conveyor 40. Next, FIG. 40 illustrates movement of the lower conveyor 40 from the right-hand vertical track 34 to the left-hand vertical track 32. Once in position under the storage unit 20f, the actuators 36a lower the storage unit 20f onto the lower conveyor 40. Accordingly, as shown in FIG. 41, the storage and retrieval system 10 has completed one cycle. That is, the storage unit 20d is now in the place where the storage unit 20c was located before the sequence started as shown in FIG. 29. The location of the storage unit 20d in FIG. 41 is the preferred location where the user 12 accesses the contents of the storage unit 20d from the window 42 as shown in FIGS. 1 and 2. The storage and retrieval system controller will perform as many cycles as necessary to present the appropriate or desired storage unit 20 to the user 12.

Figure 42:
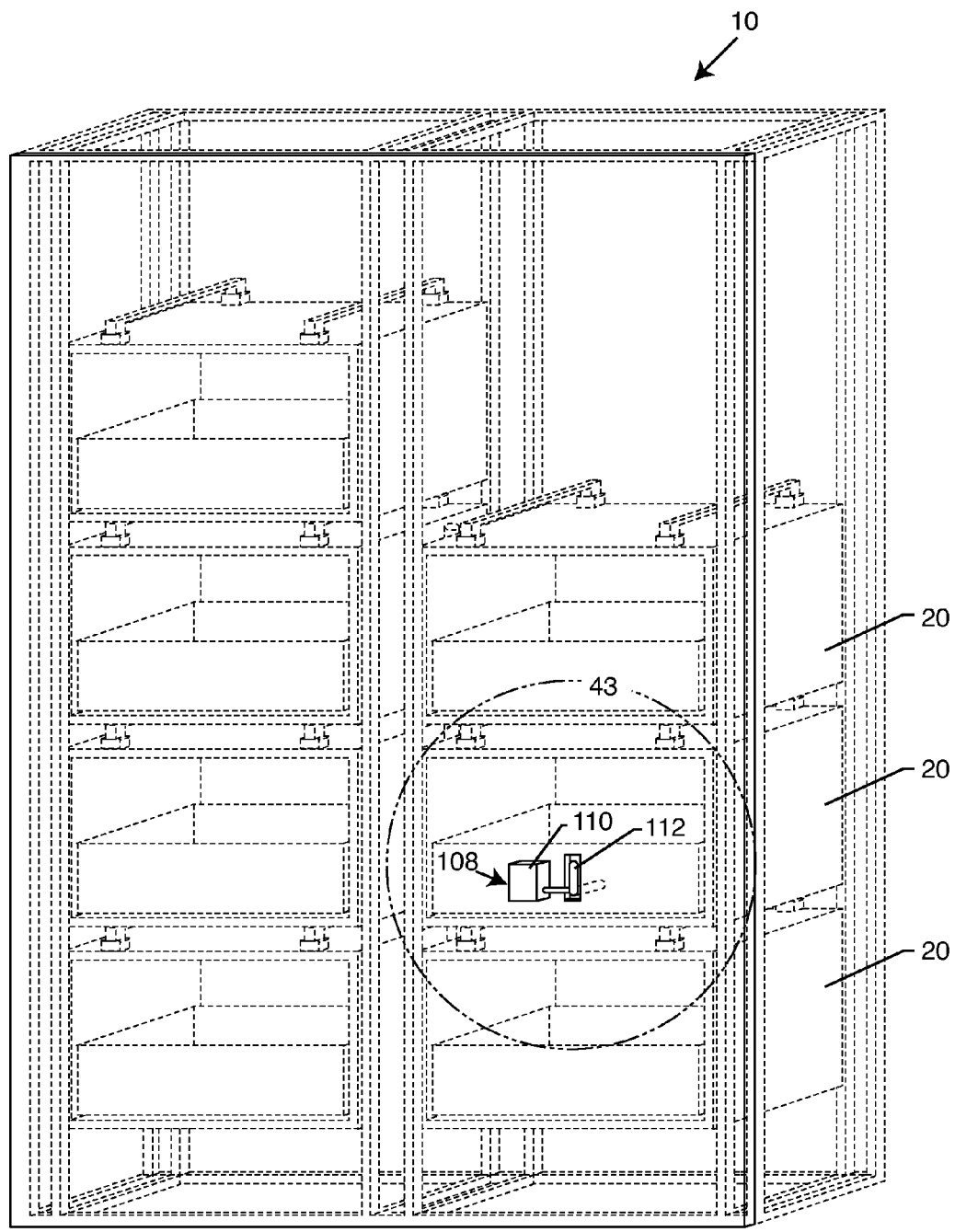
FIG. 42 is a rear perspective view of the storage and retrieval system, illustrating a storage bin deployment mechanism.
Figure 43:
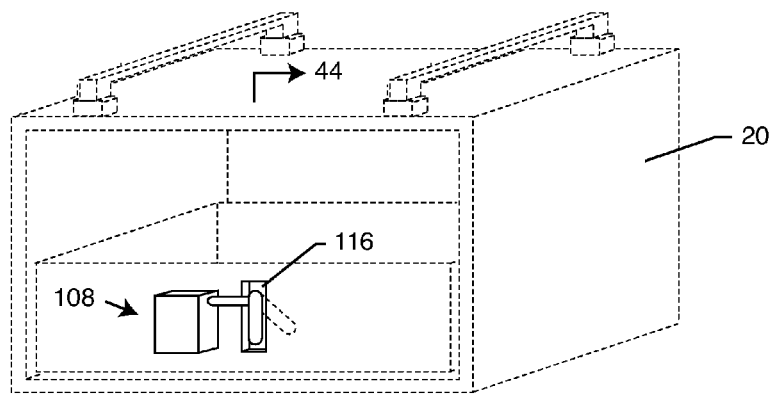
FIG. 43 is an enlarged perspective view taken about the circle 43 in FIG. 42, further illustrating activation of the storage bin deployment mechanism.
Figure 44:
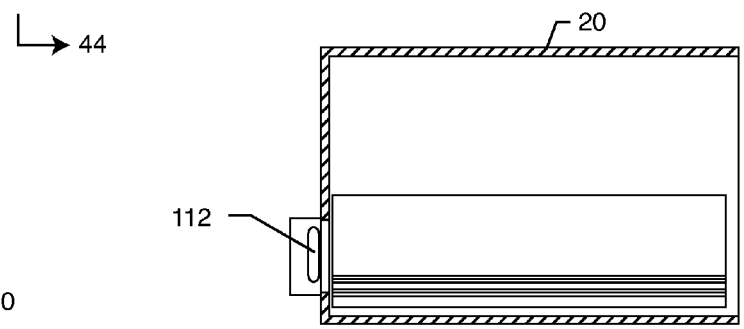
FIG. 44 is a side view of a storage bin aligned with the storage bin deployment mechanism.
Figure 45:
FIG. 45 is a side view similar to FIG. 44, illustrating activation of the storage bin deployment mechanism.
Figure 46:
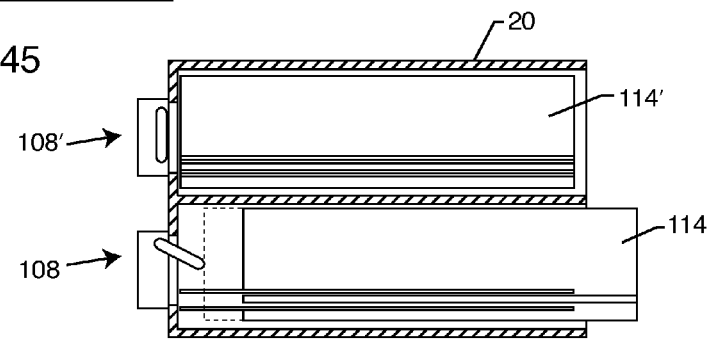
FIG. 46 is an alternative side view, illustrating multiple storage bin deployment mechanisms associated with a storage unit.

FIG. 42 illustrates a bin extension mechanism 108, which is designed to make the storage units 20 more accessible. Specifically, the bin extension mechanism 108 includes a motor 110 that operates or rotates an extender 112 to present one or more bins (FIGS. 43-50) to the user 12 out through the window 42. For example, FIG. 43 specifically illustrates the operation of the bin extension mechanism 108 in association with a storage bin 114. The bin extension mechanism 108 preferably mounts to the frame 18 and is pre-aligned with an aperture 116 in the storage unit 20. FIG. 44 shows alignment of the extender 112 with the aperture 116. Accordingly, once the storage unit 20 is positioned at the window 42 (FIGS. 1 and 2), a controller may activate the bin extension mechanism 108 such that the motor 110 rotates the extender 112 forward to contact the storage bin 114 as shown in FIG. 45. Such contact pushes the storage bin 114 out from within the housing of the storage unit 20. The storage bin 114 includes a guide rail 118 slidably disposed within a complementary pair of guide rails 120 extending out from the inner walls of the storage unit 20. FIG. 46 illustrates an alternative embodiment wherein the storage and retrieval system 10 includes a pair of the bin extension mechanisms 108, 108' for use with two storage bins 114, 114' within the storage unit 20.

Figure 47:
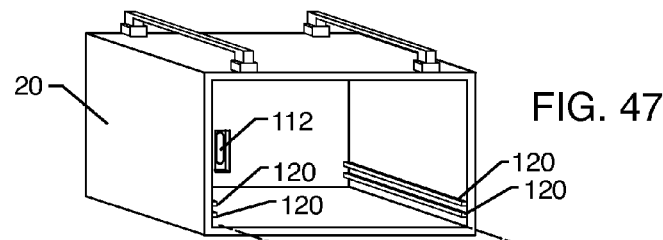
FIG. 47 is a perspective view of a storage unit having a single storage bin.
Figure 48:
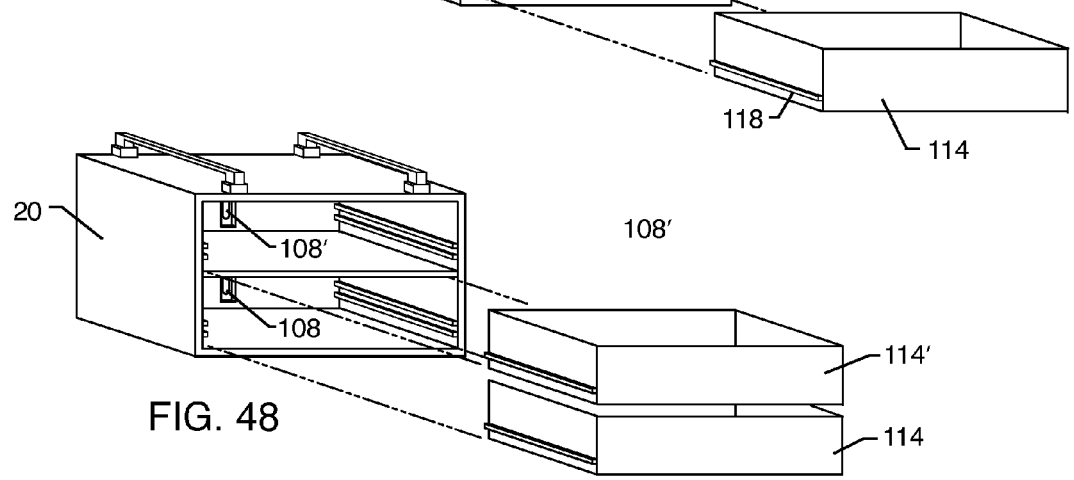
FIG. 48 is a perspective view illustrating a storage unit having two storage bins and associated storage bin deployment mechanisms.
Figure 49:
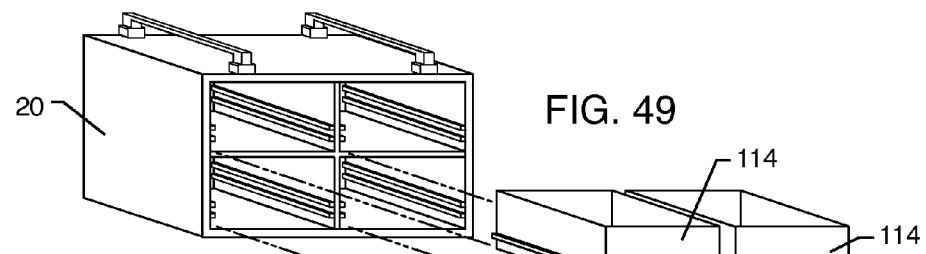
FIG. 49 is an alternative perspective view, illustrating a single storage unit having four storage bins.
Figure 50:
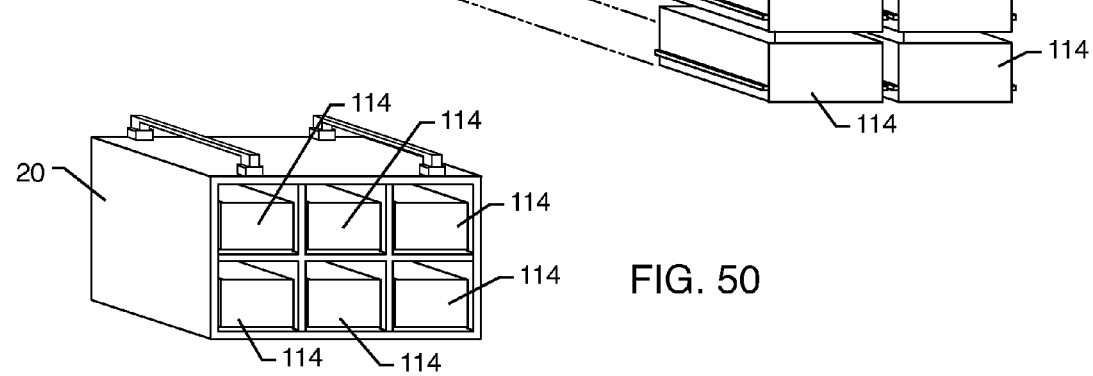
FIG. 50 is a perspective view of another alternative storage unit having six storage bins therein.

FIGS. 47-50 illustrate several different configurations of the storage unit 20. FIG. 47 illustrates one embodiment wherein a single storage bin 114 slidably resides within the interior of the storage unit 20. The pair of guide rails 120 slidably receives the guide rail 118 on the storage bin 114 to ensure that the storage bin 114 does not tip or otherwise fall out of the storage unit 20 when the extender 112 of the bin extension mechanism 108 is activated. FIG. 48 illustrates an alternative embodiment wherein the storage unit 20 is configured to house two storage bins 114, 114', which are aligned with respective bin extension mechanisms 108, 108'. FIG. 49 illustrates another alternative embodiment wherein the storage unit 20 retains four storage bins 114 and FIG. 50 illustrates another alternative embodiment wherein the storage unit 20 houses six of the storage bins 114. A person of ordinary skill in the art will readily recognize that the storage unit 20 may be configured in many different ways. Additionally, the storage bins 114 may also come in different shapes and sizes. The storage bins 114 may be associated with one or more of the extension mechanisms 108, or the storage bins 114 may include a different mechanism that enables the user 12 to access the contents of the storage bins 114 at the window 42 (FIGS. 1 and 2).

Although several embodiments have been described in detail for purposes of illustration, various modifications may be made to each without departing from the scope and spirit of the invention. Accordingly, the invention is not to be limited, except as by the appended claims.

What is claimed is:

1. A storage and retrieval system, comprising:
   a frame having at least two columns adjacent to one another;
   a track disposed within each column, each track being generally parallel to one another;
   a plurality of storage units that reside and move within the tracks of each column;
   an actuator coupled to the frame for displacing one or more storage units in one or more of the columns;
   a first upper conveyor comprising a vertically hanging hook selectively movable for drop-hang engagement with a catch top-mounted to each storage unit for movement of at least one storage unit between a first position in one column and a first position in another column; and
   a second lower conveyor comprising a skid selectively movable between the at least two columns for supporting the bottom of at least one storage unit and carrying said storage unit in non-sliding relation between a second position in one column and a second position in another column;
   wherein sequential activation of the actuator, the first conveyor, and the second conveyor permits sequential clockwise or counterclockwise movement of the plurality of storage units within the frame.

2. The system of claim 1, wherein the tracks are generally vertically disposed within the columns, the first conveyor moves at least one storage unit between an uppermost position in one column to an uppermost position in another column, and wherein the second conveyor moves at least one storage unit between a lowermost position in one column to a lowermost position in another column.

3. The system of claim 1, including a low-friction material disposed along an interior surface of each of the tracks to permit movement of the storage units within the interior of the frame.

4. The system of claim 3, wherein the storage units are wheelless.

5. The system of claim 1, including a sensor for determining the position of one or more of the storage units.

6. The system of claim 5, wherein the sensor comprises a proximity sensor or a limit switch.

7. The system of claim 1, wherein the actuator, the first conveyor and the second conveyor are power-driven.

8. The system of claim 1, including a control circuit for simultaneously coordinating the movement of the actuator, the first conveyor and the second conveyor.

9. The system of claim 1, including a housing covering the frame and insulating the storage units therein.

10. The system of claim 9, wherein the housing includes a window for providing access to one storage unit.

11. The system of claim 10, including an externally accessible touch screen interface coupled to the frame and accessible through the housing.

12. The system of claim 11, wherein selection of one storage unit with the touch screen interface activates the actuator, the first conveyor and the second conveyor to sequentially move the storage units within the interior of the frame such that the selected storage unit is presented through the window.

13. The system of claim 1, wherein each storage unit includes one or more wheelless storage bins disposed therein.

14. The system of claim 13, including a bin deployment mechanism coupled to the frame for pushing one or more of the storage bins out from within the frame.

15. The system of claim 13, wherein the storage bins slidably reside within the storage unit.

16. The system of any of claims 1-12, including an arm associated with the actuator for selectively engaging one of the storage units.

17. The system of claim 16, wherein the arm is activated by a spring-tensioned solenoid deployment mechanism.

18. The system of any of claims 1-12, wherein the actuator comprises a first actuator positioned to selectively displace one or more storage units in one column and a second actuator positioned to selectively displace one or more storage units in another column, the first and second actuators being movable independently of one another.

19. The system of claim 1, wherein the first conveyor moves between columns along a first support rail.

20. The system of any of claims 1-12, wherein the second conveyor is coupled to a second support rail for moving one of the storage units between columns.

21. The system of claim 20, wherein the second conveyor comprises a carriage adapted to releasably retain a storage unit during movement between columns.

\* \* \* \* \*